United States Patent
Kohno

[11] Patent Number: 6,118,897
[45] Date of Patent: *Sep. 12, 2000

[54] INTERACTIVE DRAWING RECOGNITION PROCESSING METHOD AND APPARATUS THEREOF

[75] Inventor: Hideki Kohno, Tokyo, Japan

[73] Assignee: Nippon Steel Corporation, Tokyo, Japan

[*] Notice: This patent is subject to a terminal disclaimer.

[21] Appl. No.: 09/296,526

[22] Filed: Apr. 22, 1999

Related U.S. Application Data

[62] Division of application No. 08/625,520, Mar. 26, 1996, Pat. No. 5,987,173.

[30] Foreign Application Priority Data

| Mar. 27, 1995 | [JP] | Japan | 7-093013 |
| Mar. 27, 1995 | [JP] | Japan | 7-093014 |
| Mar. 31, 1995 | [JP] | Japan | 7-100049 |
| May 25, 1995 | [JP] | Japan | 7-126886 |

[51] Int. Cl.[7] ..................................... G06K 9/46
[52] U.S. Cl. .......................... 382/190; 382/309; 345/440
[58] Field of Search .................... 382/100, 113, 382/197, 199, 190, 206, 309–311; 345/440–443, 467–472

[56] References Cited

U.S. PATENT DOCUMENTS

| 4,718,103 | 1/1988 | Shojima et al. | 382/13 |
| 4,783,829 | 11/1988 | Miyakawa et al. | 382/22 |
| 4,807,143 | 2/1989 | Matsuura | 364/468 |
| 4,843,569 | 6/1989 | Sawada et al. | 364/518 |
| 5,016,007 | 5/1991 | Iihoshi et al. | 340/995 |
| 5,377,102 | 12/1994 | Nishiishigaki | 364/420 |
| 5,583,949 | 12/1996 | Smith et al. | 382/199 |

*Primary Examiner*—Bhavesh Mehta
*Attorney, Agent, or Firm*—Pollock, Vande Sande & Amernick, R.L.L.P.

[57] ABSTRACT

A drawing is read by a scanner to create raster data. A labeling process is executed for the data to extract a contour line for each pattern element resultant from the labeling process to produce contour line data and region data to manage, in a tree structure, information related to a circumscribed rectangle of each line segment of the contour line. When the operator picks by a pointing device a predetermined region on the screen of a display and a pair of line segments for recognition, there is retrieved region data corresponding to the specified region. After extracting contour line data associated with the retrieved region data, a center line creation process is executed according to the extracted contour line data.

21 Claims, 21 Drawing Sheets

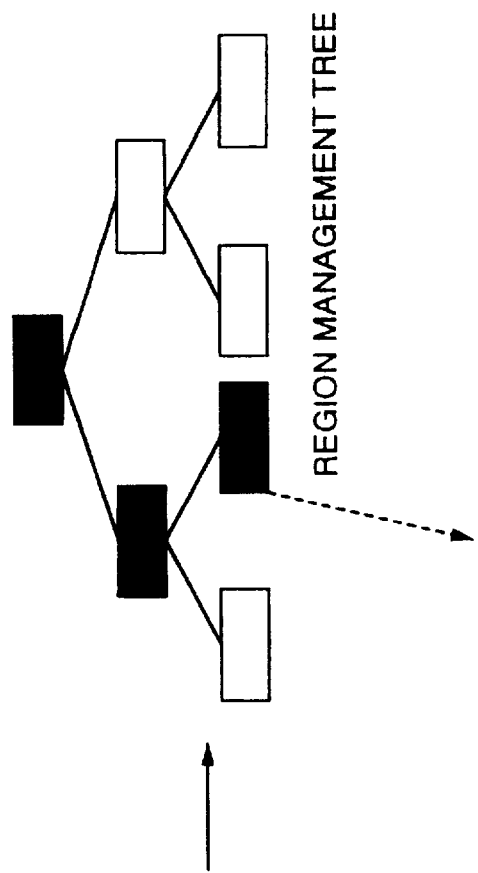
FIG.5A
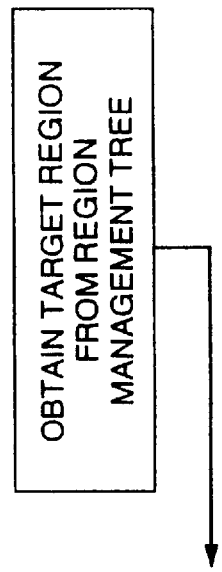
FIG.5B
REGION MANAGEMENT TREE
FIG.5C
OBTAIN TARGET REGION FROM REGION MANAGEMENT TREE
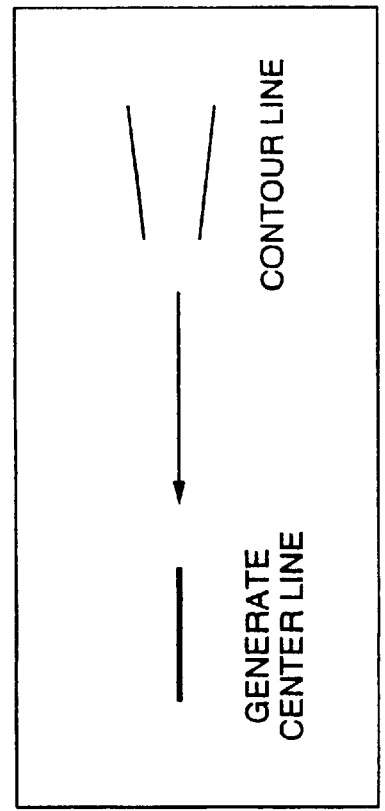
FIG.5D
GENERATE CENTER LINE → CONTOUR LINE

FIG.7

```
linefontmember = 20              : NO.OF DEFINITIONS OF LINE TYPES
[ LINEFONT ]                     : START OF LINE TYPE PATTERN
name =BOUNDARY FOR TO,DO,        : NAME OF LINE TYPE
       AND PREFECTURES
count = 4                        : NO.OF ELEMENTS
feature = 2, 0.3                 : ISOLATED POINT WITH A DIAMETER OF 0.3mm-FEATURE OF ELEMENT
feature = 3, 2                   : NODE WITH TWO LRANCHES
feature = 0, 2.5                 : LINE SEGMENT WITH A LENGTH OF 2.5mm
feature = 3, 2                   : NODE WITH TWO LRANCHES
[ END ]                          : END OF LINE TYPE PATTERN
[ LINEFONT ]
name =DIKE
count = 2
feature = 0, 0.5                 : LINE SEGMENT WITH A LENGTH OF 0.5mm
feature = 4, 4                   : CROSSPOINT WITH FOUR OUTGOING LINES
[ END ]
[ LINEFONT ]
name = JR
count = 2
feature = 0, 2.5                 : LINE SEGMENT WITH A LENGTH OF 2.5mm
feature = 1, 2.5                 : BOLD LINE WITH A LENGTH OF 2.5mm
[ END ]
[ LINEFONT ]
name =BOUNDARY FOR
       VEGETATION
count = 1
feature = 2, 0.3                 : POINT WITH A DIAMETER OF 0.3mm
[ END ]
... ...
```

FIG.8
feature = ?, xxx
? → TYPE OF ELEMENT
    0 : LINE SEGMENT
    1 : BOLD LINE SEGMENT
    2 : ISOLATED POINT
    3 : NODE
    4 : CROSSPOINT
xxx → FEATURE OF ELEMENT
    LINE SEGMENT LENGTH
    LINE SEGMENT LENGTH
    DIAMETER OF ISOLATED POINT
    NO. OF BRANCHES
    NO. OF OUTGOING LINES
FIG.9A
BOUNDARY FOR TO, DO, AND PREFECTURES
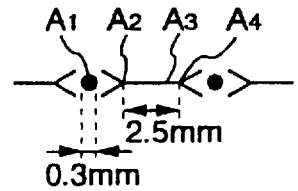
FIG.9B
DIKE
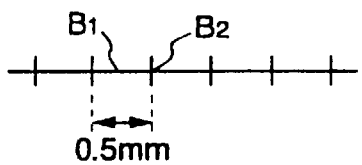
FIG.9C
JR
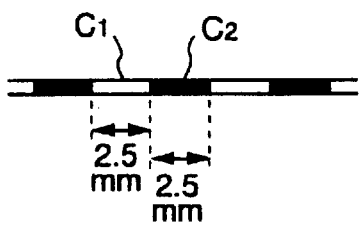
FIG.9D
BOUNDARY FOR VEGETATION

FIG. 15A
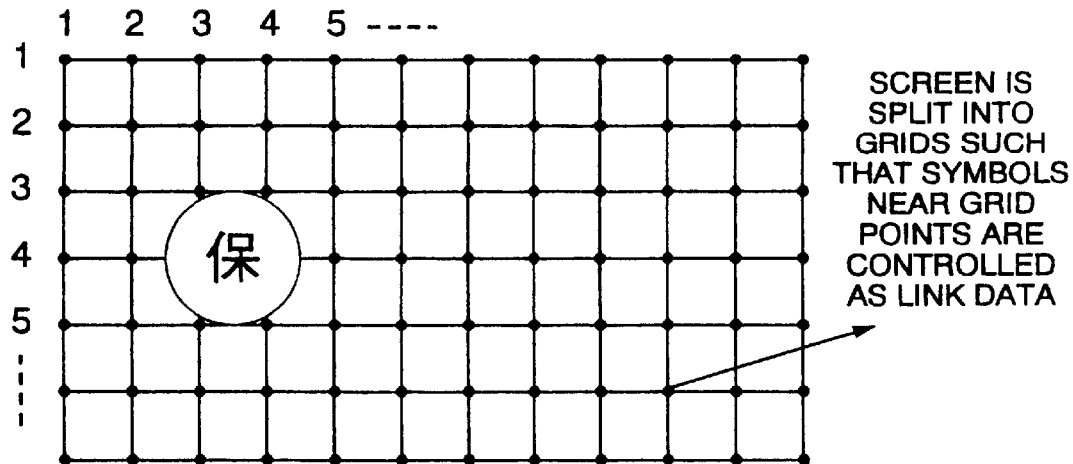
SCREEN IS SPLIT INTO GRIDS SUCH THAT SYMBOLS NEAR GRID POINTS ARE CONTROLLED AS LINK DATA
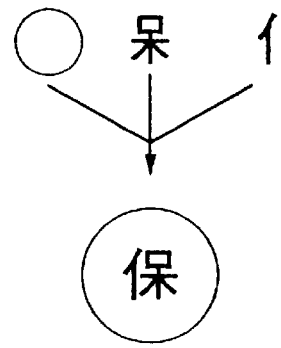
FIG. 15B
```
4   3   2
5   ●   1
6   7   8
```
SYMBOL IS DIVIDED INTO EIGHT PARTITIONS ACCORDING TO RELATINE POSITIONAL RELATIONSHIP PARTITIONS ARE CHECKED FOR MATCHING IN DIRECTIONAL RELATIONSHIP
INCLUSION/NON-INCLUSION TO BE SEPARATELY SPECIFICD

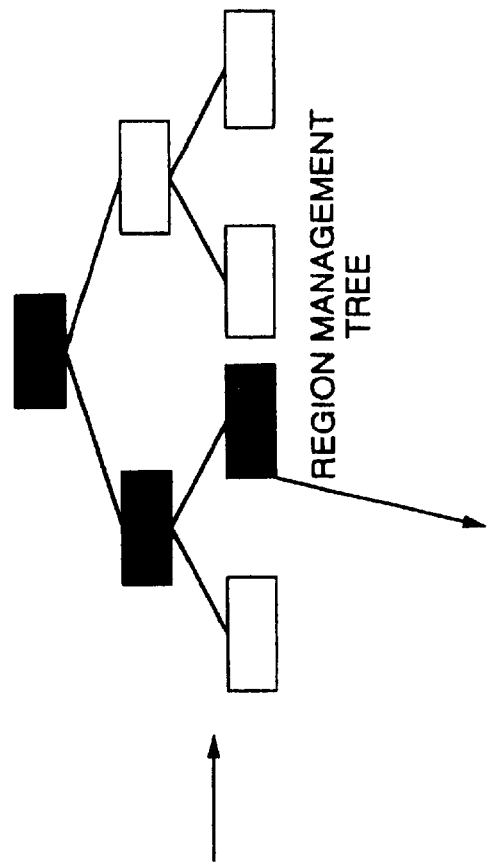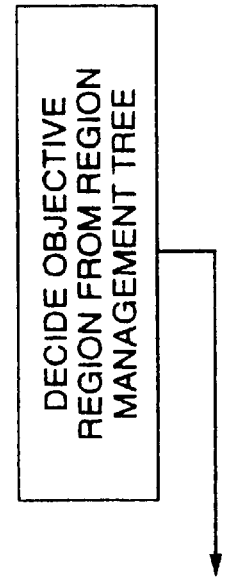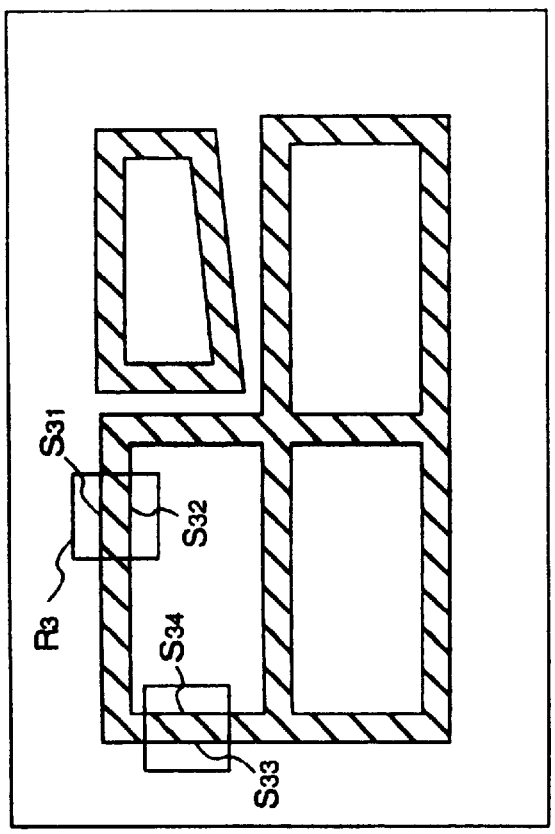

HOUSE BEING RECOGNIZED

REGISTERED HOUSE

HOUSE BEING REGISTERED

REGISTERED HOUSE

INTERACTIVE DRAWING RECOGNITION PROCESSING METHOD AND APPARATUS THEREOF

This application is a divisional of Ser. No. 08/625,520 filed Mar. 26, 1998, now U.S. Pat. No. 5,987,173.

BACKGROUND OF THE INVENTION

1. Field of the Invention

The present invention relates to an interactive drawing recognition processing method which performs a vector producing process for each pattern element, which is included in image data, for example, in order to generate a data base of an existing drawing.

2. Description of the Related Art

To construct a data base of existing drawings such as maps and diagrams of machines, there have been proposed various drawing recognition processing methods. FIG. 1 shows an example of the processing procedure of the interactive drawing recognition processing method according to the prior art. In the interactive drawing recognition processing method, a drawing is read by a scanner to create raster data (run length data) basically in the run length form (step 52). The run length data is displayed on a screen of a display. Next, to vectorize or transform each pattern or drawing elements into vectors, there is conducted, for example, a core or center line production process. In this case, when the operator specifies by a position input device or a pointing device a domain or region of the drawing to be recognized on the screen, the run length data contained in the specified domain is processed such that centers of the run lengths are connected to each other to produce a center line (step 54). Interactively conducting the core production process for the other drawing elements, there is attained vector data by performing a modification of the drawing and so forth (step 56). Thereafter, a character recognition is accomplished for character strings included in the drawing and a structure forming process is carried out, for example, to assign attributes to the pattern and to establish relationships between patterns, thereby producing a structured data base.

Moreover, according to a conventional line type recognition method, existing drawings such as maps and diagrams of apparatuses are first inputted to the recognition system to attain binary image data and then a vectorizing process is conducted for the binary image data. Thereafter, when a predetermined pattern is specified, a retrieval is effected with vector data for a series of patterns to be continued from the specified pattern according to a predetermined program. A check is then made to decide whether or not the attained series of patterns repeatedly includes the predetermined pattern, thereby recognizing the line type thereof.

Additionally, there has been conventionally proposed various map input systems in which a map is read, pattern elements thereof are converted into vector data, and patterns of houses are recognized to be assigned with codes. For example, in an interactive map data input system of the prior art, the map is first read by a scanner to produce binary image data. Subsequently, the operator picks by a pointing device each pattern element to transform the element into vector data. Furthermore, the operator picks each of the house patterns such that the system recognizes the house pattern and then creates a code for the pattern. Thereafter, symbols included in the map are recognized and the structure forming process is carried out, for example, to decide attributes of the patterns and to relate the patterns to each other, thereby attaining a structured data base.

However, in the interactive drawing recognition processing method of the prior art, when producing vectors from the respective pattern elements, the run length data is directly processed to generate center lines. Consequently, in the center line generating process or a medial line extraction, it is required to carry out several processes such as decisions of contours and positions of run lengths. Therefore, this leads to a problem that a long period of time is required to completely accomplish the center line generation for the pattern after the operator specifies the pattern to be recognized.

In addition, according to the conventional line type recognition method, the line type of a series of patterns is recognized at a time according to the vector data of the overall drawing and hence there exists a problem of the insufficient processing speed in the recognition. Furthermore, since the line type is recognized according to the program, any line type other than those taken into consideration in the program cannot be coped with. This causes a problem in that only a preset range of line types can be recognized.

Moreover, according to the interactive map input system of the prior art, in the process to recognize the house patterns, the operator specifies the house patterns one by one, leading to a problem that a considerably heavy load is imposed on the operator and the process can be achieved only at a low speed.

SUMMARY OF THE INVENTION

It is an object of the present invention to provide an interactive drawing recognition processing method capable of decreasing a period of work time from when a pattern to be recognized is specified to when the center line generation process is completely finished for the pattern.

Another object of the present invention is to provide a line type recognition method for use in a drawing input apparatus in which the line recognition process can be simply carried out and the range of recognizable line types can be easily extended.

Further, another object of the present invention is to provide a house recognition method in a map input system in which the process can be accomplished at a high speed while mitigating the work load imposed on the operator.

An interactive drawing recognition processing method according to the present invention comprises the steps of: reading in advance a drawing as a processing object; generating a contour line data by obtaining a contour line for each pattern element which is attained from a labeling process for an obtained image data, and a region data which manages in a tree structure regional information related with a region indicating in which region each line segment is contained in the overall drawing for each line segment which constitutes a contour line. Next, when a region containing a pair of line segments constituting the contour line is specified, the region is retrieved data associated with the specified region; and extracting the contour line data corresponding to the region data which is obtained by the retrieving, and then generating a central line of the specified pair of line segments according to the extracted contour line data.

An interactive drawing recognition processing method according to the present invention, further comprises, after generating the central line of the pair of line segments, the steps of: tracing another pair of line segments, which is connected to the pair of line segments, according to the contour line data; and generating a center line of the traced another pair of line segments.

In an interactive drawing recognition processing method according to the present invention, the contour line data is undergoes a polygonal approximation process.

A line type recognizing method according to the present invention, comprises the steps of: memorizing in advance a line type pattern data in which a reference feature is registered for each constituent element which constitutes a line type pattern of each line type; generating a contour line data by taking out a contour line for each pattern according to a binary image data obtained by reading a drawing; identifying, when a line type of a objective line to be recognized on a screen and a position of a constituent element of the objective line, a type of the constituent element of the objective line according to the contour line data; and extracting a feature for the constituent element of the objective line, and then deciding whether or not the objective line is the same as the specified line type by comparing the extracted feature with the reference feature corresponding to the objective line.

A house recognizing method according to the present invention, which comprises a step of reading in advance a map as a processing object and a step of recognizing a house pattern after converting an obtained binary image data to a vector data, further comprises the steps of: extracting, when a frame is specified on a screen, in the frame as a recognition objective house pattern, a pattern which has a closed-loop contour and a size not less than a predetermined size; and indicating whether or not the recognition objective house pattern is registered, after shaping the extracted recognition objective house pattern into a house contour and displaying the house contour on the screen.

A house recognizing method according to the present invention, further comprises, after shaping the recognition objective house pattern into the house contour, a step of performing, when an edge of the recognition objective house pattern is shifted from an edge if an already registered house pattern, a connection process of removing the shift between the edges, the edges being inherently overlapped with each other.

According to the interactive drawing recognition method of the present invention, there are produced in advance contour line data of contour lines attained from each of the pattern element and region including information related to regions to be managed in a tree structure, the information indicating regions in the overall drawing in which the respective line segments constituting the contour lines are included. Thanks to the provision, when a region containing a pair of line segments included in a contour line is specified, region data corresponding to the specified region can be efficiently retrieved. Consequently, contour line data associated with the region data obtained as a result of the retrieval can be extracted at a high speed to achieve the center line generation.

Moreover, according to the interactive drawing recognition processing method of the present invention, after the center line is created for a pair of line segments, it is possible to trace another pair of line segments linked with the pertinent pairs of line segments according to only the contour line data. Therefore, the center line generation of the traced pair of line segments can be automatically conducted.

In accordance with the line type recognition method of the present invention, for each line type, there is stored line type pattern data in which a reference feature is registered for each constituent element of the line type pattern such that, according to binary image data attained by reading a drawing, contour lines are obtained for each pattern of the drawing to produce contour line data. When a line type of a line to be recognized on the screen and a position of a constituent element of the line are specified, the line type of the constituent element is identified according to the line contour data and there is extracted a feature for the constituent element. Thereafter, the extracted feature is compared with the reference feature corresponding to the line to recognize the line type for each constituent element. When compared with the conventional case in which the line type is recognized for a series of patterns at a time according to the vector data of the overall drawing, the line type recognition can be more simply accomplished. Additionally, for example, when a new line type is included in a map, a reference feature of each constituent element constituting a new line type pattern of the new line type can be easily added to the existing line type pattern data. When a map having the same contents as another is represented in a different scale, the reference feature of each line type beforehand registered to the line type pattern data can be easily altered to arbitrarily expand the range of recognizable line types.

According to the house recognition method of the present invention, when a frame is specified on a screen image, a pattern which is in a closed loop having at least a predetermined size in the frame is extracted, shaped, and displayed on the screen. Therefore, after specifying house patterns for recognition at a time, the operator is only required to indicate whether or not each of the specified images is to be registered according to the result displayed on the screen. This consequently reduces the work load on the operator and increases the processing speed. In addition, since the house patterns to be recognized can be specified at a time in the frame, operability is improved when compared with the conventional interactive processing method.

Furthermore, according to the house recognition method of the present invention, after the house patterns of the recognition objects are shaped into house contours or shapes, a necessary correction or modification can be achieved for the house patterns when a connection process is conducted for the house patterns of the recognition objects by executing a connection process for the obtained house contours.

The interactive drawing recognition processing apparatus according to the present invention includes an image input device for reading a drawing as a processing object and thereby attaining raster data, a pointing device for indicating coordinates of a position of a recognition objective pattern in the drawing, a central processor for executing a labeling process for the raster data produced from the image input device, and a feature extracting process of extracting a feature for each pattern element labeled and attaining element data contour line extracting process of extracting edges of the raster data for each of the pattern elements and obtaining contour line data, and region data creating process of generating region data to manage for each line segment of the contour line in a tree structure, the information being related to a circumscribed rectangle of segment is also provided. The apparatus further includes an element file for storing the element data created by the central processor, contour line file for storing the contour line data generated by the central processor, a region file for storing the region data produced by the central processor and a vector file. The central processor references, when a recognition objective pattern is specified from the pointing device, the region file to detect the region data associated with the specified recognition objective pattern, references the contour line file to extract the contour line data related to the detected region data, conducts a center line creation for each of the line segments of the extracted contour line to generate a center line, creates vector data according to the resultant center line, and stores the created vector data in the vector file.

Additionally, the interactive drawing recognition processing apparatus of the present invention further includes a line type pattern file for storing line type pattern data for each line type in which a predetermined feature is registered for each of the constituent elements obtained by dividing a line type pattern of the line type. After the vector data is stored in the vector file, the processor references, when a line type of the recognition objective line to be recognized and a position of a constituent element of the recognition objective line are specified from the pointing device, the contour line file to identify a type of the constituent element according to the contour line data, and extracts a feature of the constituent element. The processor then references the line type pattern file to compare the extracted feature with the reference feature corresponding to the recognition objective line, and judges to determine whether or not the recognition objective line is of the specified line type.

Furthermore, in the interactive drawing recognition processing apparatus according to the present invention, after the vector data is stored in the vector file, the central processor extracts, when a frame is specified in the drawing by the pointing device, as a recognition objective house pattern having a closed-loop contour and a size not less than a predetermined size in the frame specified from the pointing device and shapes the extracted recognition objective house pattern into a predetermined house contour.

BRIEF DESCRIPTION OF THE DRAWINGS

These and other objects and advantages of the present invention will become apparent by reference to the following description and accompanying drawings wherein:

FIGS. 5A to 5D are diagrams for specifically explaining the center line generation in the interactive drawing recognition processing method according to the present invention;

FIG. 7 is a diagram for explaining the structure of a line type pattern file of FIG. 2;

FIG. 8 is a diagram for explaining specifications of features of the respective constituent elements of the line patterns in the line type pattern file;

FIGS. 9A to 9D are diagrams for specifically explaining constituent elements of line type patterns;

FIGS. 15A and 15B are diagrams for explaining a relative positional relationship when the symbol includes a plurality of constituent elements;

FIGS. 21A to 21D are diagrams for specifically explaining the center line generation in an embodiment of the house recognition method according to the present invention;

DESCRIPTION OF THE PREFERRED EMBODIMENTS (Interactive Drawing Recognition Processing Method and Apparatus Thereof according to the Present Invention)

Figure 1:
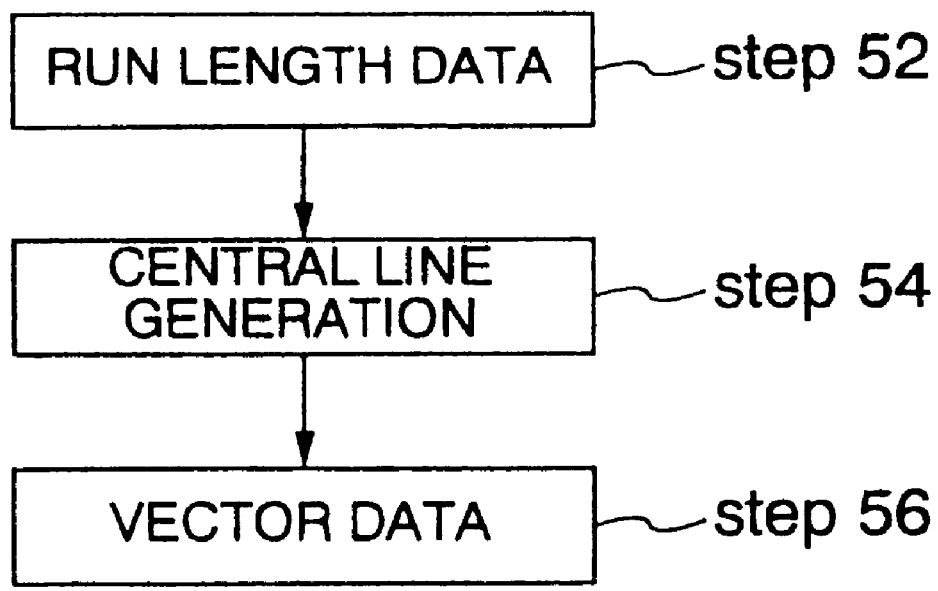
FIG. 1 is a diagram showing the procedure of the center line generation in the interactive drawing recognition processing method of the prior art.
Figure 2:
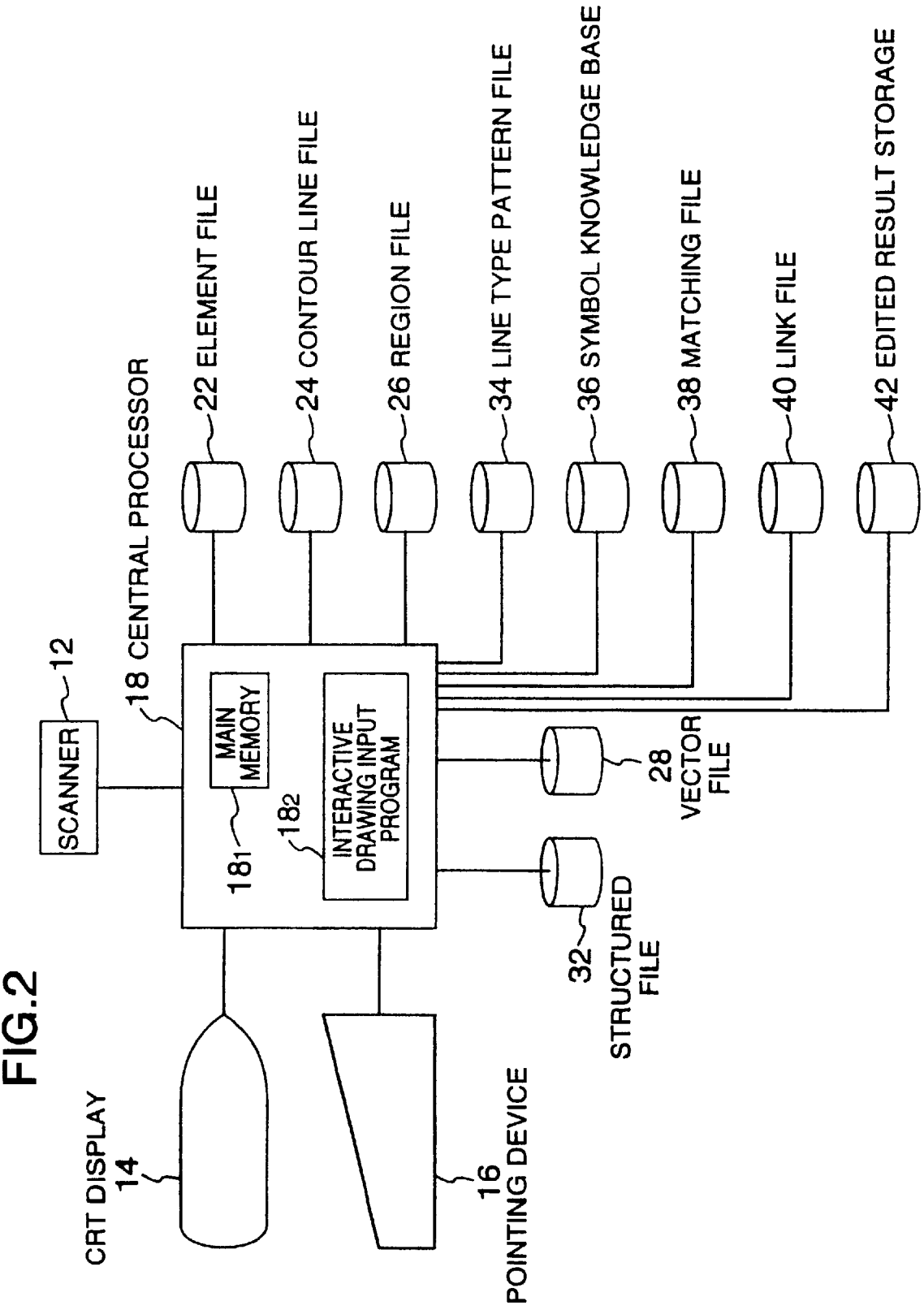
FIG. 2 is a diagram schematically showing the construction of a computer aided design (CAD) system utilizing an embodiment of the interactive drawing recognition processing apparatus according to the present invention.

As shown in FIG. 2, a computer aided design (CAD) system as an embodiment of the interactive drawing recognition processing apparatus of the present invention includes a scanner 12 as an image input device, a cathode-ray tube (CRT) display 14, a pointing device 16, a central processor 18, an element file 22, a contour line file 24, a region file 26, a vector file 28, a structured file 32, a line type pattern file 34, a symbol knowledge base 36, a matching file 38, a link file 40, and an edited result storage 42. Incidentally, the CAD system is employed, for example, to produce a data base of existing drawings such as maps and diagrams of machines.

The scanner 12 optically scans a drawing to produce binary image data as inputs to the system. The CRT display 14 displays thereon the inputted result.

In this system, the binary image data inputted from the scanner 12 is raster data basically in the run length format used in facsimiles or the like. The raster data is vector data of which the start point is indicated by the coordinates at which the pixel value starts changing, for example, from "0 (white)" to "1 (black)" on a scan line and the finish point is represented by the coordinates at which the pixel value starts changing, for example, from "1" to "0" on the scan line.

The pointing device 16 conducts the following operations and includes a keyboard, a mouse, and the like.

(a) To indicate a recognition target pattern, data of coordinates indicating positions of the recognition target pattern is inputted.

(b) When achieving the line type recognition, a line type to be recognized and/or a start position of the recognition are/is specified.

(c) To register a symbol, a frame is specified on the screen of the CRT display 14 by the mouse and then the symbol is selected in the frame.

(d) When conducting the house recognition, a frame is specified on the screen of the CRT display 14 by the mouse and then patterns contained in the frame are selected at a time.

The element file 22 is used to store therein features extracted for each pattern element data (to be simply referred to as "element data" herebelow) obtained by labeling the raster data. In this case, the features of the element data include the barycenter, area, circumscribed rectangle, moment, etc. In the contour line file 24, there is stored data of contour lines attained by extracting edges of raster data for each element data. The contour line is approximated by a polygon and includes many line segments. One contour line forms a closed loop including broken or polygonal lines. Therefore, the contour line data is represented as data for each contour line, the data being attained by transforming line segments constituting the line into vectors. In this regard, the element data are linked by the contour line data and file pointers or by address pointers on the memory.

Figure 3:
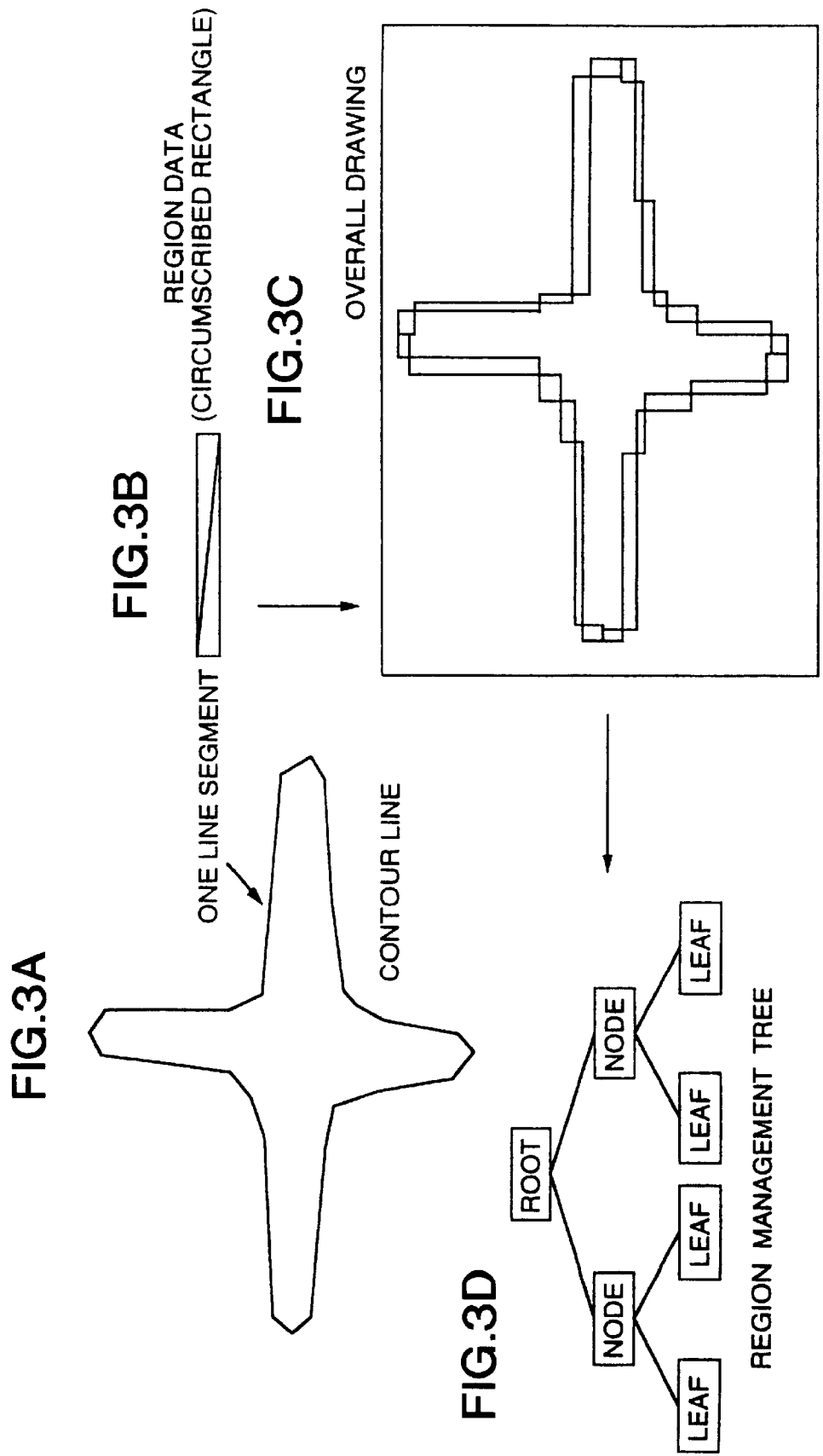
FIGS. 3A to 3D are diagrams for explaining the structure of region data in the interactive drawing recognition processing method according to the present invention.

Stored in the region file 26 is region data indicating in which region of the overall drawing each line segment constituting the contour line is contained. The region data is managed in a tree structure including a root, a branch node, and a leaf. In the data management according to the tree structure, each node represents a region at an intermediate point of subdivision of a drawing and a leaf designates a region as the minimum division unit. A pointer to contour line data contained in a region represented by a leaf is related to the leaf and is stored in a main memory 18, of the processor 18. Consequently, when a region is specified, the system can retrieve a leaf corresponding to the specified region to decide line segments of a contour line contained in the region according to pointers related to the retrieved leaf. Description will be given of the operation related to, for example, the tree structure of region data related to a pattern having the shape of substantially a cross. FIG. 3A shows a contour line including edges of the raster data for the cross pattern. The line segments constituting the contour line are managed for each circumscribed rectangle associated therewith (reference is to be made to FIG. 3B). The overall drawing is split into regions each of which includes one circumscribed rectangle of each of the line segments, as shown in FIG. 3C. As can be seen from FIG. 3D, the process of subdivision is represented in the form of a region management tree the leaves of which correspond to the minimum partition regions.

The symbol knowledge base 36 is provided to store therein symbol knowledge representing features of symbols to be registered. Stored in the matching file 38 are any symbols (or constituent elements) matching an isolated raster. Additionally, the link file 40 is disposed to store therein link data for isolated raster data, the link data denoting a grid point nearest thereto when the screen is subdivided according to the grid unit. In the edited result storage 42, there is stored such information items attained when the operator edits the recognition result, as symbols for which the recognition has been attempted, symbols successfully recognized, symbols for which the recognition has been failed, and symbols erroneously recognized. The information items stored in the edited result storage 42 are utilized in the update of features and the like.

Particularly, the embodiment employs a region multi-dimensional (R-MD) tree to manage region data. The R-MD tree is a multi-dimensional tree in which information related to regions is converted into coordinates to increase the data retrieving speed. Concretely, according to the R-MD tree, a two-dimensional circumscribed rectangle is expressed by a central position thereof $(x_c, y_c)$ and lengths $x_w$ and $y_w$ thereof in x and y directions, respectively. The set of four values $(x_c, y_c, x_w, y_w)$ characteristic to the circumscribed rectangle are assumed to indicate a point in a four-dimensional coordinate system. A predetermined coordinate conversion is further conducted for the obtained point such that the resultant point is managed in the form of a multi-dimensional tree in the new four-dimensional coordinate system.

The central processor 18 executes predetermined processes according to an interactive drawing input program $18_2$ stored therein. For example, a labeling process is conducted as a pre-processing according to the input binary image data (raster data); a feature extraction process and a contour extraction process are carried out to create element data, contour line data, and region data. Moreover, a center line generation is interactively accomplished for a recognition target pattern to produce vectors according to raster data. The vector file 28 is arranged to store therein vector data resultant from the vector producing process. Additionally, the central processor 18 executes a structure decision process including an attribute assigning process to assign meanings and attributes to patterns and a relationship establishing process to define semantic relationships between the patterns. The structured data is stored in the structured file 32, which is used as a CAD data base.

In addition, the processor 18 executes a symbol recognition process and a process in which symbols resultant from the recognition are interactively edited on the screen and features and the like of the registered symbols are updated according to the edited results. The update process is executed by depressing "Update" button displayed in the screen of the CRT display 14.

Furthermore, the processor 18 performs a house recognition process after the vector generation to recognize house patterns to produce codes associated therewith. In this process, a shaping process and a connection process may also be effected. The shaping process is conducted for the following reason. In a stage in which the house patterns are simply transformed into vectors, there may exist a case in which one edge thereof is represented with a plurality of polygonal lines, which are to be shaped into one line. Moreover, a corner of the house patterns may possibly have been rounded or chamfered. The rounded portion is to be shaped into the original corner. The connection process is executed in the following case. Between a house pattern as the recognition target and a house pattern beforehand registered to the system, when a side of the former is shifted from the associated side of the latter, the positional shift is to be removed by the process.

Figure 4:
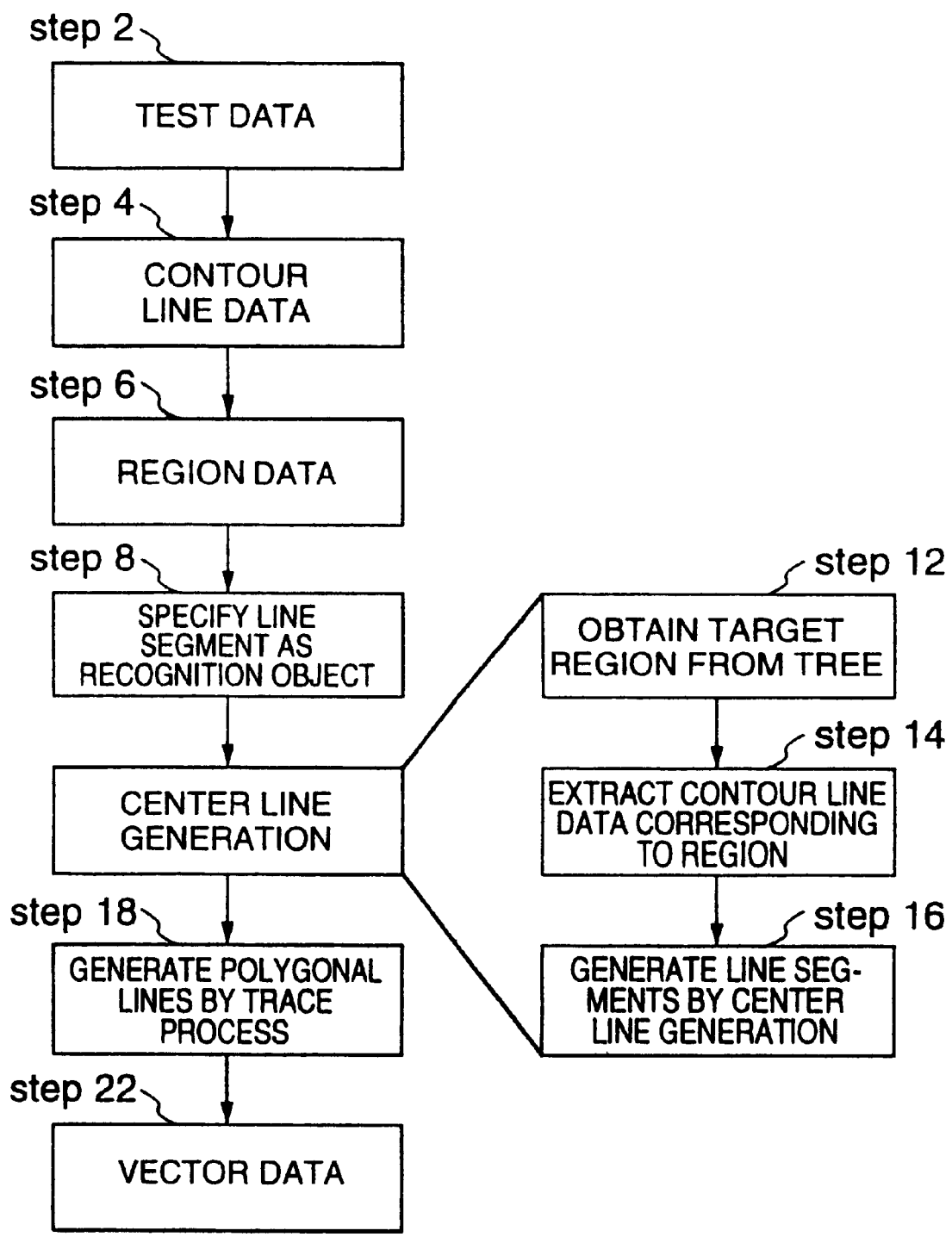
FIG. 4 is a diagram showing the procedure of the center line generation in the interactive drawing recognition processing method according to the present invention.

Subsequently, the interactive drawing recognition processing method of the embodiment will be described with reference to FIG. 4 and FIGS. 5A to 5D. FIG. 4 is a flowchart for explaining a procedure of producing center lines for a recognition target pattern according to the method, whereas FIGS. 5A to 5D are diagrams for specifically explaining the center line generation.

First, the drawing is read by the scanner 12 to attain raster data (step 2 of FIG. 4). There is obtained, for example, raster data of a cross-shaped pattern as shown in FIG. 5A. The central processor 18 executes a labeling process for the raster data, extracts therefrom features of the respective pattern elements thus labeled to produce element data, and stores the data in the element file 22. Additionally, the processor 18 obtains edges from raster data of each pattern element to store the data of a contour line in the contour line file 24 (step 4). Next, according to the contour line data, the processor 18 creates region data for each line segment of the contour line to manage information related to the circumscribed rectangle in the tree structure (step 6). In this connection, the processor 18 automatically executes the operations up to this point after the drawing is read by the scanner 12. The contour line and circumscribed rectangle may be visible or invisible to the user.

Next, the center line creation is interactively carried out for the target pattern. The center line creation in this case means a process to determine a line, for example, connecting the centers of two circles respectively inscribed on two lines. First, the operator picks by the pointing device 16 a predetermined region (the aperture region of a cursor) in the screen of the CRT display 14 to specify a pair of line segments for the recognition thereof (step 8). In this situation, as can be seen from FIG. 5A, the operator picks a predetermined region $R_1$ and then designates two substantially parallel lines $S_1$ and $S_2$ on the left-hand side of the cross-shaped pattern. In response thereto, there is conducted a search through the region management tree to detect a leaf corresponding to the region $R_1$ designated in screen (step 12 of FIG. 5C). According to a pointer stored in association with the leaf, the process extracts from the contour line file 24 contour line data corresponding to line segments $S_1$ and $S_2$ (step 14). Next, as shown in FIG. 5D, the process conducts an operation to generate a center line for the extracted two segments $S_1$ and $S_2$ to attain the center line (step 16). After the center line is produced for the line segments according to the specified region, the system achieves a trace process for the two line segments to continuously generate center lines. In short, since the contour line itself is one closed line, the system directly accesses the contour line file 24 to automatically attain line segments linked to the line segments $S_1$ and $S_2$ previously undergone the center line creation, the segments $S_1$ and $S_2$ being extended in a predetermined direction, e.g., toward the right in FIG. 5A. The obtained center lines form a polygonal line (step 18). In this process, when the target point reaches, for example, a crosspoint of the cross-shaped pattern, the center line cannot be generated and hence the center line creation is stopped. Thereafter, when the operator specifies by the pointing device 16 a pair of line segments as another recognition object, e.g., two line segments S3 and S4 substantially parallel to each other on the upper portion of the cross-shaped pattern, the center line creation is similarly carried out for these segments.

In the operation, when the center line creation is stopped, the operator may freely edit or modify the center lines generated up to the point. For example, during the center line creation for a hand-written drawing, the operator may correct a position of a line, transform a curved line into a straight line, or modify a line generated by mistake. Incidentally, in the modification, only the vector data attained by the center line creation is modified. Namely, the original raster data is kept unchanged.

After the center line creation is performed for the contour line of a desired pattern element as above, a predetermined process is executed for the data resultant from the center line creation. For example, a plurality of polygonal lines are approximately transformed into a line. In a case where the image includes, for example, level lines related to data of a map, the lines are smoothed in the process. The vector data attained according to the data resultant from the center line creation is stored in the vector file 28 (step 22). Thereafter, a symbol recognition process is conducted for symbols contained in the drawing. In addition, a structure decision process is interactively carried out such that the attained structure data is stored in the structured file 32. Incidentally, although the symbol recognition process requires the element data and contour line data, the contour line data is linked with the element data. Consequently, the contour line data is obtained via the element data in the process.

According to the interactive drawing recognition processing method of the embodiment, there are produced contour line data by obtaining edges for the respective pattern elements according to the raster data thereof and region data in which information related to a circumscribed rectangle of line segments constituting the contour line is managed according to a tree structure such that the contour line data is supervised by the region data. Thanks to this provision, when a region including a pair of line segments is specified as the recognition target, the system can efficiently retrieve region data associated with the designated region to extract contour line data corresponding to the retrieved region data at a high speed so as to achieve the center line creation for the specified region. Therefore, the period of time lapsed from when a pair of line segments are specified for the recognition target to when the center line generation is finished for the line segments can be minimized. In addition, after the center line is produced for the pair of line segments, another pair of line segments linked with the line segments previously processed can be traced at a high speed only according to the contour line data without using the region data. This makes it possible to automatically execute the center line creation for the traced line segments.

Although the tree structure is a region multi-dimensional (R-MD) tree in this embodiment, there may be used a k-d tree, or the like.

According to the interactive drawing recognition processing method described above, there are created in advance the contour line data by attaining a contour line for each image element and the region data including, for each line segment constituting the contour line, information indicating a region in the overall drawing in which the line segment exists, the information being managed according to a tree structure. Due to the contour line data and the region data, when a region including a pair of line segments constituting a contour line is specified, region data associated with the designated region can be effectively retrieved and hence contour line data corresponding to the retrieved region data can be obtained at a high speed to achieve the center line creation for the specified region. Therefore, the period of time necessary for the operation can be minimized.

Moreover, after the center line is produced for the pair of line segments, another pair of line segments connected to the line segments previously processed can be traced at a high speed only according to the contour line data. Therefore, it is possible to automatically execute the center line creation for the traced line segments.

(Line Type Recognition Method of the Present Invention)

Description will be next given of an embodiment of the line type recognition method according to the present invention. The line type recognition method of the embodiment is employed to recognize types (line types) of lines drawn in a map and can be achieved in a CAD system shown in FIG. 2.

Figure 6:
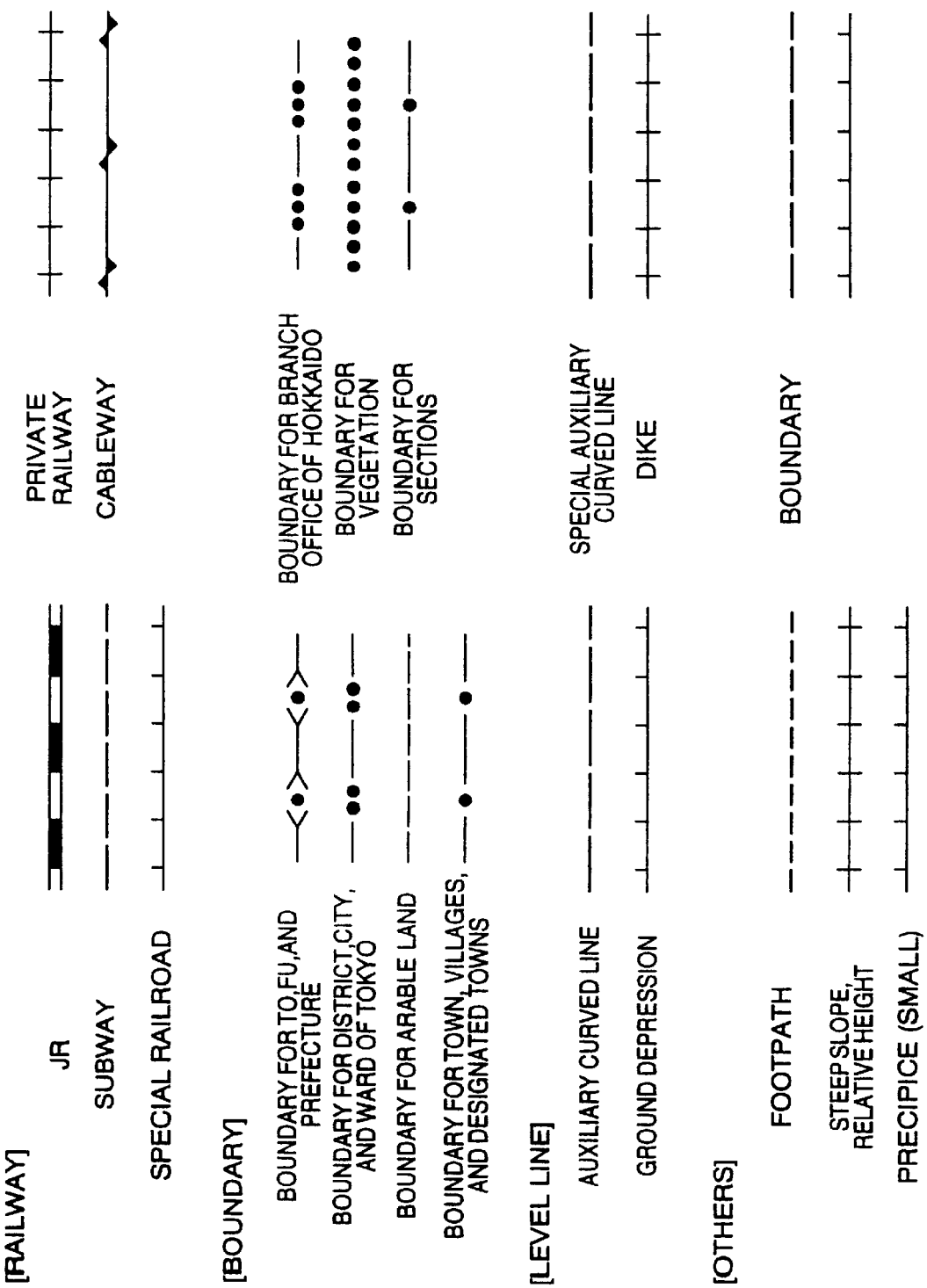
FIG. 6 is a diagram for explaining line types as recognition objects in an embodiment of the line type recognition method according to the present invention.

According to "Kokudo Kihonzu Zushiki Do Tekiyo Kitei (Fundamental Land Diagrams and Application Rules Thereof)" published from the Geographical Survey Institute of the Ministry of Construction of Japan, there are stipulated many line types to be adopted in maps. In the description of the present invention, the line types of recognition targets are particularly limited to the railways, boundaries, level lines, etc. as shown in FIG. 6. The line types representing railways include the Japan Railways (JR), private railway, subway, cableway, and special railroad. The line types expressing boundaries include the boundary for To, Fu, and prefectures, boundary for branch offices of Hokkaido, boundary for district, city, and ward of Tokyo, boundary for vegetation, boundary for arable land, boundary for sections, and boundary for towns, villages, and designated towns. In addition, the boundaries standing for level lines include the auxiliary curved line, special auxiliary curved line, ground depression, and the like. Moreover, line types as recognition objects include the footpath, boundary, steep slope/relative height, and precipice (small). Each of these line types repetitiously includes a predetermined pattern, which includes a combination of constituent elements such as a line segment, a node or branch point, a crosspoint, and an isolated point. Therefore, in this embodiment, the line type is recognized by achieving comparison of predetermined features for each constituent element.

In the line type pattern file 34 shown in FIG. 2 is stored line type pattern data obtained for each line type by subdividing a line type pattern thereof into a set of elements, the data including a predetermined reference feature of each of the elements. In this embodiment, there are five kinds of constituent elements used, such as the line segment (ordinary line segment), bold line segment, node, crosspoint, and isolated point. The bold line segment is included for the recognition of JR. The features, respectively, of the line segment and bold line segment are represented by the length of line segment. Additionally, an isolated point has an area in an actual map and hence the diameter thereof is used as the feature thereof. The feature of a node is represented by the number of branches from the node, the branches being associated with a line entering the node. For a crosspoint, the number of lines extending or outgoing therefrom (number of outgoing lines) is used as the feature.

The layout of the line pattern file 34 will be described by referring to FIG. 7. In this diagram, the first field "linefontmember" is disposed to store therein the number of line types defined in the file 34. In this example, the number of definitions of line types is set to 20 as shown in FIG. 6. Thereafter, the features of each line type pattern are described in fields enclosed by [LINEFONT] and [END]. In the fields representing the features, the name of line type is set to a field "name", the number of elements constituting the pattern is described in a field "count", and a feature of each element is specified in a field "feature". Two numeric values are set to each of the fields "feature" in which the first value express the type of the element and the second value specifies the feature. The values designating element types are as shown in FIG. 8 in which "0" to "4" are used to represent the ordinary line segment, bold line segment, isolated point, node or branch point, and crosspoint, respectively. Additionally, the values specifying the features are set to express those related to the elements, respectively.

Description will now be specifically given of the contents of the line pattern file 34 in association with several line types. In the first example, line types to represent boundaries for To (of Tokyo To), Fu (e.g., Kyoto Fu), and prefectures. As can be seen from FIG. 9A, the line type pattern includes combinations of such four elements as isolation point $A_1$, node $A_2$, line segment $A_3$, and node $A_4$. Isolation point $A_1$ has a diameter of 0.3 mm, line segment $A_3$ possesses a length of 2.5 mm, and nodes $A_2$ and $A_4$ each have two branches. Therefore, a value "4" is set to the "count" field. Two values "2,0.3" are set to the first "feature" field as features of isolated point $A_1$. Set to the second "feature" field are two values "3,2" indicating features of node $A_2$. In the third "feature" field, there are set two values "0,2.5" as features of line segment $A_3$. Features of node $A_4$ are set as values "3,2" to the "fourth" feature field. Description will next be given of a second example related to line types representing dikes. The line type pattern is formed by combining two elements including line segment $B_1$ and crosspoint $B_2$ as shown in FIG. 9B. The line segment B1 is 0.5 mm long and crosspoint B2 has four outgoing lines. Consequently, the "count" field is set to "2". Described in the first "feature" filed are values "0,0.5" as features of line segment $B_1$. Feature values of crosspoint $B_2$ are set as "4,4" in the second "feature" field. Next, as a third example, line types representing Japan Railways (JR) will be described. As can be seen from FIG. 9C, the line type pattern is constituted with combinations of two elements, i.e., ordinary line segment $C_1$ and bold line segment $C_2$ which are 2.5 mm long. In consequence, the "count" field is set to "2" and the first and second "feature" fields are assigned with feature values "0,2.5" and "1,2.5" respectively of line segments $C_1$ and $C_2$. Subsequently, a fourth example of specification of line types will be described in conjunction with the boundary for vegetation. As shown in FIG. 9D the line type pattern includes one constituent element of isolated point D having a diameter of 0.3 mm. Therefore, "1" is set to the "count" field and values "2,0.3" are described in the "feature" field indicating features of isolated point D.

In this regard, when the numbers respectively of branches and outgoing lines above are employed to express features related to nodes and crosspoints, it is impossible to discriminate, e.g., the branching state indicating whether there exists a Y-shaped branch or T-shaped branch in the node. However, when all features of the constituent elements are combined with each other, the line type can be uniquely identified. Namely, even if the line type cannot be exactly discriminated in association with each element, there arises no problem. In this case, moreover, although an angle can be considered as the feature associated with nodes and crosspoints, the process to recognize the line type is complicated when the angle is incorporated in the system, which consequently is unsuitable for this embodiment.

The central processor 18 executes predetermined processes according to the interactive drawing input program 18₂ stored therein. For example, according to the binary image data (raster data) received, the processor 18 carries out in the pre-processing stage the labeling process, feature extraction process, and contour line extraction process to produce element data, contour line data, and region data. The processor 18 further conducts the line type recognition process in an interactive manner. In the line type recognition method of the embodiment, the system traces raster data for the constituent elements of lines to be recognized and generates therefrom vectors while recognizing the line types thereof, which will be described later. Stored in the vector file 28 is the vector data resultant from the line type recognition process.

Figure 10:
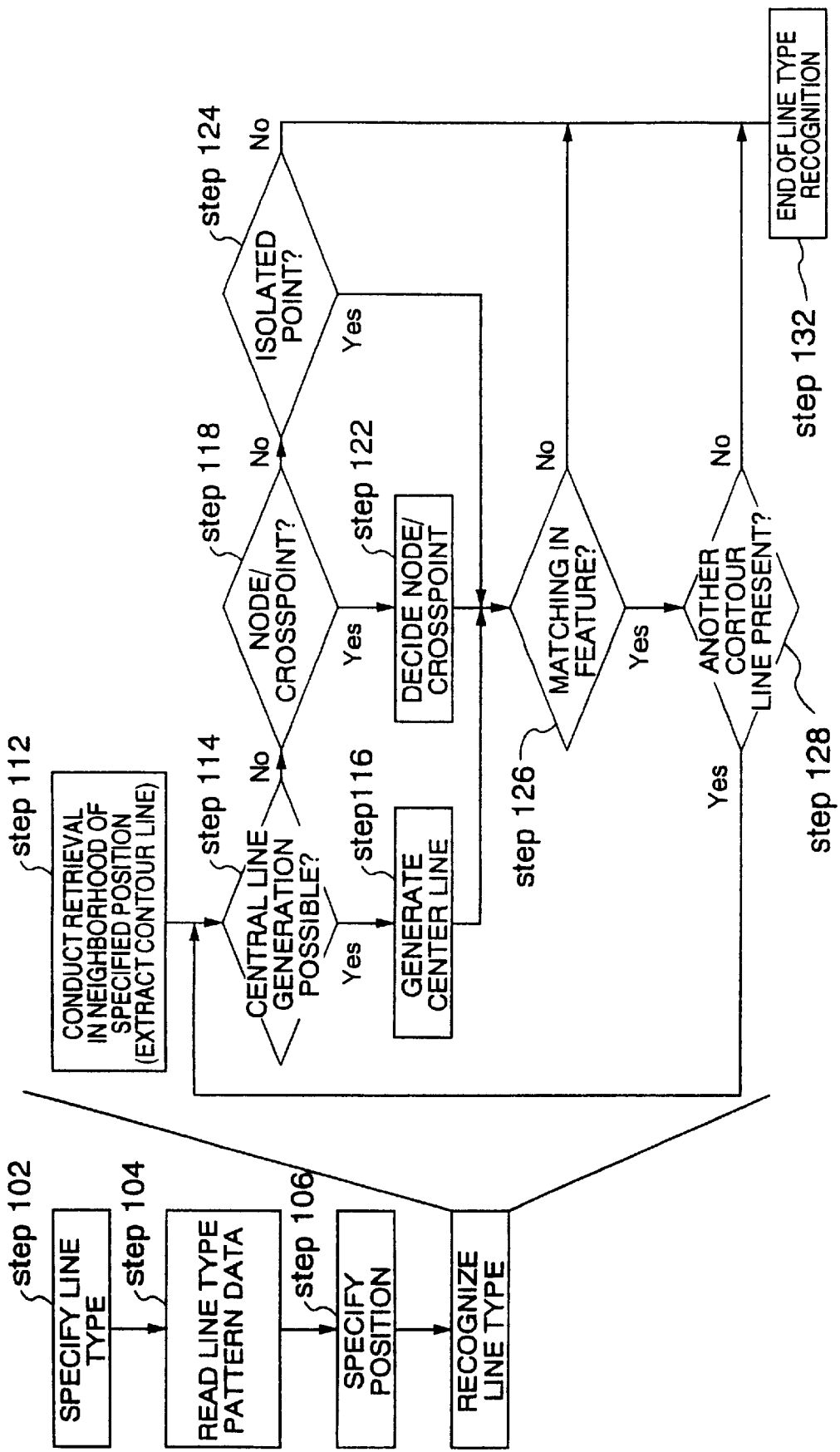
FIG. 10 is flowchart for explaining the processing procedure in an embodiment of the line type recognition method according to the present invention.
Figure 11:
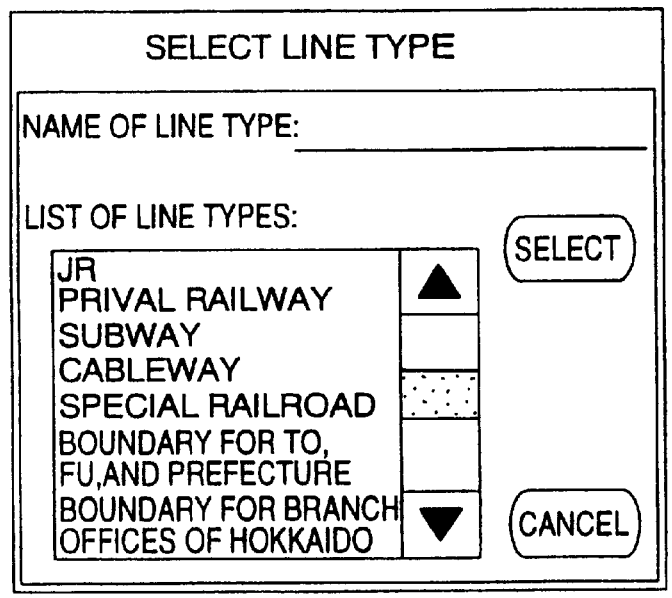
FIG. 11 is a diagram showing a menu screen image displayed to achieve the line type recognition.

Next, the line type recognition method of this embodiment will be described with reference to FIGS. 10 to FIG. 13. FIG. 10 is a flowchart for explaining the processing procedure of the line type recognition method, FIG. 11 is a diagram showing the menu screen image displayed in the line type recognition process, and FIGS. 12A to 12C and FIGS. 13A and 13B are diagrams for specifically explaining the contents of the line type recognition process.

First, the drawing is read by the scanner 12 to attain raster data thereof as descried above. The central processor 18 conducts the labeling process for the raster data, extracts features for each pattern to create element data, and then stores the data in the element file 22. Additionally, the processor 18 obtains edges of raster data for each pattern to create contour line data to be stored in the contour line file 24. Subsequently, according to the contour line data, the processor 18 produces region data to manage information in the tree structure related to a circumscribed rectangle for each line segment constituting the contour line.

Subsequently, the processor 18 executes the line type recognition process according to the flowchart of FIG. 10. First, the operator displays a predetermined menu in the screen of the CRT display 14 as shown in FIG. 11 and then specifies a line type to be recognized (step 102). In this example, when the operator selects a predetermined line type from the line type list and depressed "Select" button, the line type name is designated and the line type recognition is started for the line type. The processor 18 reads from the line type pattern file 34 line type pattern data corresponding to the specified line type (step 104). Thereafter, the operator picks by the pointing device 16 one point on a constituent element of the target line on the screen of the CRT display 14, thereby specifying the start point of the line type recognition (step 106). In this connection, according to the method in which the operator picks one point, the processor 18 retrieves line segments and/or two or more points in the proximity of the indicated point.

In response to the specification of the recognition starting point, the processor 18 identifies the constituent element of the target line at the specified position and then extracts features of the element. For this purpose, the processor 18 first makes a search through the vicinity of the designated point (step 112). Namely, the processor 18 carries out a retrieval through the region management tree to detect a leaf in the proximity of the specified position. According to a pointer memorized in association with the leaf, the processor 18 extracts from the contour line file 24 a pair of contour line data items corresponding to the element of the target line. To decide whether or not the extracted data items are associated with an ordinary or bold line segment, the processor 18 next checks to decide whether or not the center line generation is possible for the data items (step 114). The center line generation in this case means a process to attain, for example, a line drawn between the centers respectively of two circles inscribed on two line segments. This process is accomplished when two contour lines possess a predetermined parallelism, e.g., when the following three conditions are completely satisfied. The angle formed therebetween is equal to or more than 30 degrees, the distance therebetween is not less than a predetermined value (e.g., 1 mm), and each contour line has a length equal to or more than a predetermined value. When it is determined that the center line generation is possible, the processor 18 executes the process for these contour lines to create a center line (step 116). In this situation, moreover, using element data linked with the contour line data, the processor 18 decides the distance between the paired contour lines to thereby identify that the element of the target line is an ordinary line or a bold line. Furthermore, according to the length of the center line, the processor 18 obtains the feature of the ordinary or bold line segment.

Figure 12A:
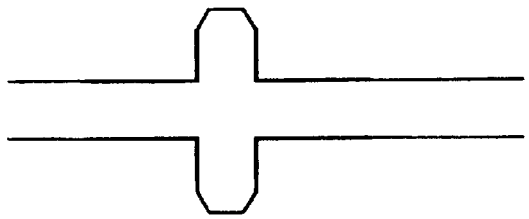
FIGS. 12A to 12C are diagrams for concretely explaining the contents of the line type recognition.
Figure 12B:
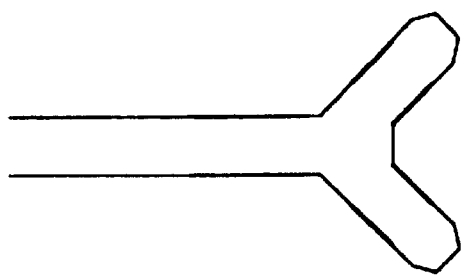
Figure 12C:
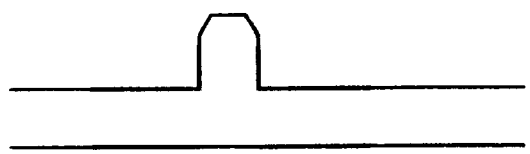

On the other hand, when it is determined in the step 114 that the center line generation is impossible, the processor 18 checks to decide whether the element of the specified target line is a node or crosspoint (step 118). In this case, in the predetermined region including the element of the line, contour line data items representing the same pattern are entirely obtained from the contour line file 24. The processor 18 then checks the obtained data items to determine the number of pairs of contour lines having the predetermined parallelism. When there exist two or more pairs of contour lines satisfying the condition, the processor 18 assumes that the element as the recognition object is a node or crosspoint. Thereafter, when it is detected that there exists in the paired contour lines any set of two pairs of contour lines which are extended at least a predetermined length in the mutually opposing direction, the element is assumed to be a crosspoint; otherwise, the element is regarded as a node (step 122). In this situation, moreover, according to the number of sets of paired contour lines having the predetermined parallelism, there is obtained the number of nodes or branches. For example, when the pattern of the lines is as shown in FIG. 12A, there are four sets of paired contour lines having the predetermined parallelism in the upper and lower positions and on the right and left sides relative to the central point of the image. Moreover, toward the right and left sides, these lines oppositely extend more than a predetermined length. Consequently, the pattern is determined as a crosspoint with four outgoing lines. Furthermore, when the pattern is as shown in FIG. 12B, there exist three pairs of contour lines having the predetermined parallelism in the left, upper-right, and lower-right positions around the center point of the figure. However, there is missing a set of lines respectively extending in the mutually opposite directions and hence the pattern is determined as a node with two branches. Additionally, when processing a pattern shown in FIG. 12C, the pattern includes three pairs of contour lines having the predetermined parallelism in the right, left, and upper position relative to the center of the image and the lines extend more than the predetermined length respectively in the right and left. Therefore, the pattern is assumed to be a crosspoint with "three" outgoing lines.

In addition, when the pattern is decided to be neither a node nor an isolated point in step 118, a check is conducted to determine whether or not the element of the target line is an isolated point (step 124). On this occasion, the processor 18 obtains element data linked with the contour line data to examine whether or not the size of the circumscribed rectangle of the pattern represented by the contour line data is contained in a predetermined range. If this is the case, the element is assumed to be an isolated point and then the diameter thereof is attained according to the size of the circumscribed rectangle. On the other hand, if the element is not an isolated point, the element is other than of the five constituent elements used in the process. Consequently, the element is naturally other than any line type to be recognized. Therefore, the line type recognition process is terminated (step 132).

In this way, the element of the objective line is identified in steps 116, 122, or 124 to extract a feature thereof such that a check is made to decide whether or not the feature thus extracted matches the reference feature related to the line type pattern data read from the line type pattern file 34 (step 126). In this case, the reference feature has a preset range to decide whether or not the extracted feature is within the range. If mismatching results between the extracted feature and the reference feature, the element of the objective line is other than the line types to be recognized and the line type recognition process is therefore terminated (step 132). On the other hand, when it is decided that the extracted feature matches the reference feature, the element of the objective line is recognized to correspond to the specified line type.

Figure 13A:
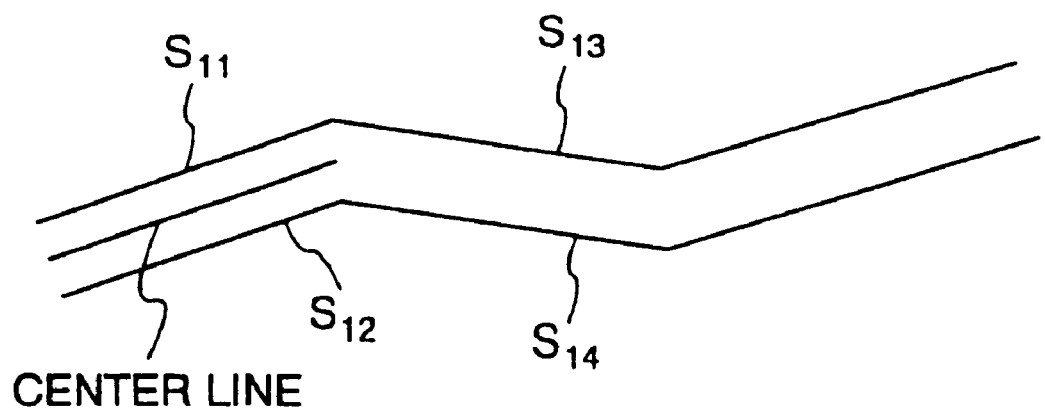
FIGS. 13A and 13B are diagrams for specifically explaining the contents of the line type recognition.
Figure 13B:
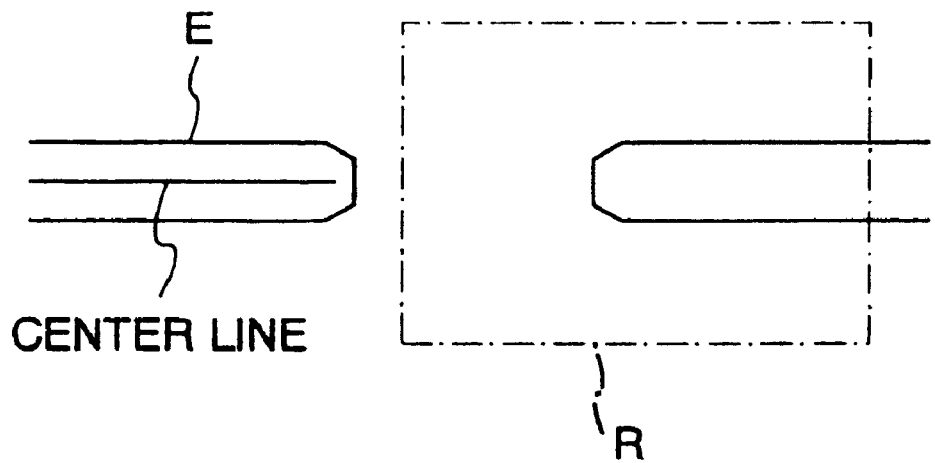
Figure 14:
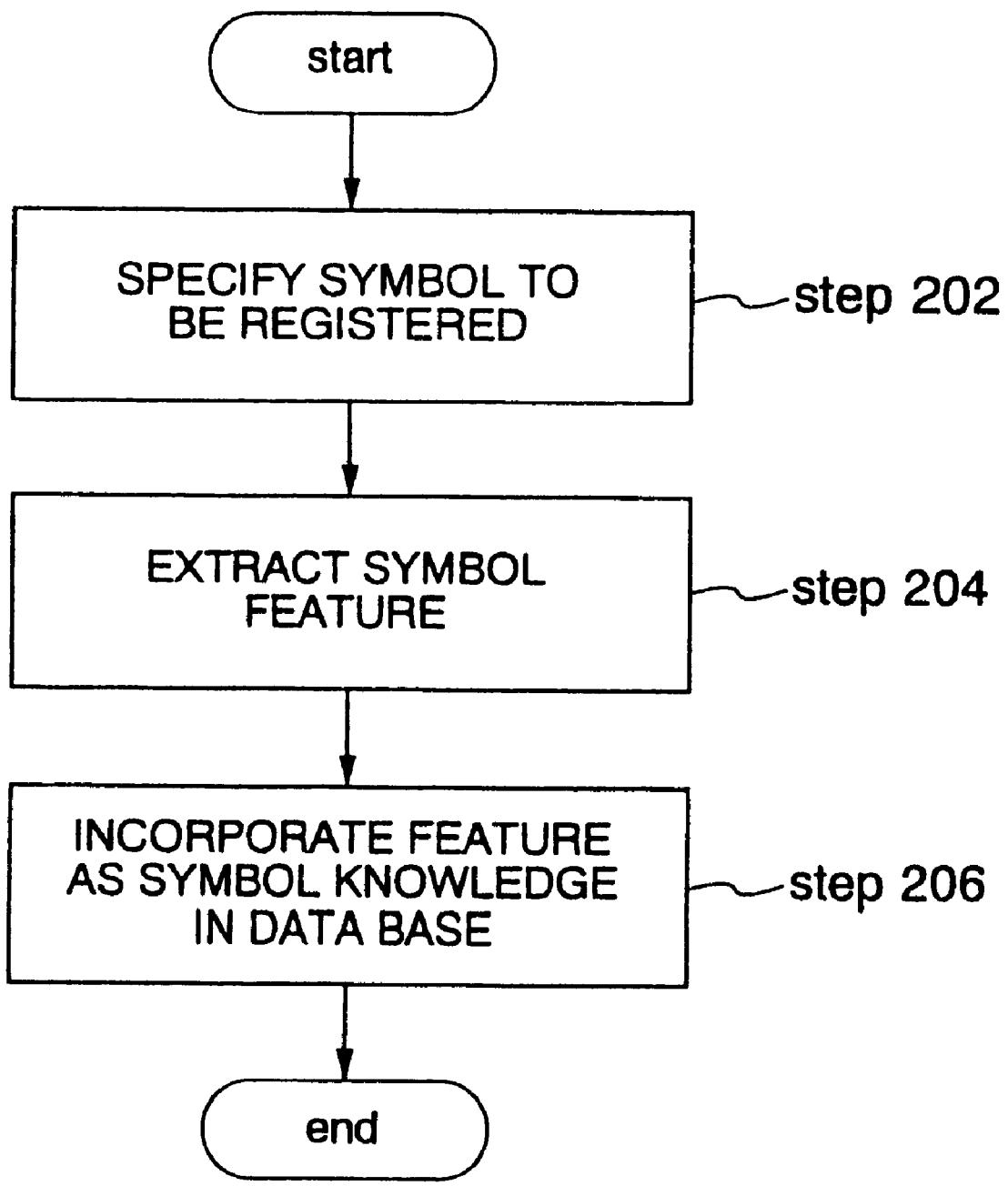
FIG. 14 is a diagram for explaining the processing procedure to register symbol features.

Moreover, after the extracted feature is assumed to match the reference feature in the step 126, to continuously achieve the line type recognition process, the processor 18 traces another line to be recognized subsequent to the pertinent constituent element and then retrieves a contour line corresponding to the traced element (step 128). For example, when the pattern is a polygonal line as shown in FIG. 13A, since the contour line is one continuous line, there are automatically obtained segments $S_{13}$ and $S_{14}$ from the contour lines, the segments $S_{13}$ and $S_{14}$ being connected to the line segments $S_{11}$ and $S_{12}$ just undergone the center line generation in a predetermined direction, e.g., in the right direction. On the other hand, the pattern may be intermitted depending on line types. For example, when processing a diagram of FIG. 13B including a broken line, the processor 18 automatically obtains a particular region R in front of a front end of constituent element E just recognized and then extracts contour line data from the region data in the same manner as for the process of Step 112. Incidentally, when the line type is initially specified, the system actually decides the method of tracing constituent elements of the objective line according to the specified line type.

As above, when there is a contour line associated with the next element to be recognized, control is transferred to step 114 to successively execute the line type recognition process. In the operation, when the constituent element to be currently recognized is assumed to have the line type specified for recognition, the processor 18 generates vector data to connect the currently recognized element to the previously recognized element and then displays the data on the screen of the CRT display 14, e.g., by replacing the target line with a bold line. In short, when the pertinent element is an ordinary line or a bold line, the center line generation is beforehand conducted to create a center line for the constituent element thereof and hence there is conducted a process to link the obtained center line with the constituent element previously recognized. Additionally, when the just recognized element is a node, a crosspoint, or an isolated point, there is achieved a process to draw one line so as to establish a connection from the pertinent element to the previously recognized element.

In this regard, when the line type recognition is accomplished up to a constituent element arranged at an end position of the screen, the processor 18 automatically scrolls the screen image to continue the recognition process. Moreover, the recognition is executed in a predetermined direction beginning at a position of the image first designated. However, in a case in which the elements of the objective line are not successively disposed in the form of a loop, when the process reaches an end of the screen, the operator need only depress the "Reverse" button in the screen. In response thereto, the recognition process is achieved in the opposite direction beginning at the position first denoted.

Thereafter, when the recognition process is completely finished in sequence for all elements of lines to be recognized, there is missing a contour line corresponding to an element of the subsequent line in step 122 and hence the process is terminated (step 132). The vector data obtained through the line type recognition is stored in the vector file 28. This process is followed by the structure decision process for the vector data, for example, the data is assigned with attributes and is classified according to layers.

According to the line type recognition method of this embodiment, for each constituent element of the line type pattern of each line type, there is beforehand memorized a line type pattern data to which a reference feature is registered. According to binary image data obtained by reading a drawing, the system produces contour line data by extracting a contour line for each pattern. When a line type of a line to be recognized in the screen image as well as a position of a constituent element of the objective line are specified, the system identifies the type of the element of the line according to the contour line data and then extracts the feature for the element of the line to thereafter compare the extracted feature with the reference feature associated with the objective line, thereby recognizing the line type for each element. With this provision, the line type recognition process can be easily accomplished when compared with the conventional case in which the line recognition is carried out at a time for a series of patterns according to the vector data of the overall drawing.

In addition, when a map includes, for example, lines of a new line type, a reference feature related to each constituent element of the new line type pattern thereof can be easily added to the existing line type patterns. When the scale varies between two maps having the same contents, the reference feature of each line type registered in advance to the line type pattern data can be simply altered. In consequence, the range of recognizable line types can be freely expanded.

As described above, in accordance with the line type recognition method of the present invention, there is beforehand stored, for each constituent element of the line type pattern of each line type, line type pattern data to which a reference feature is registered. The system produces, according to binary image data obtained by reading a drawing, contour line data by extracting a contour line for each pattern. When there are specified a line type of a line to be recognized in the screen image as well as a position of a constituent element of the objective line, the system identifies the type of the element of the line according to the contour line data to extract the feature for the element of the line so as to thereafter compare the extracted feature with the reference feature associated with the objective line, thereby recognizing the line type for each element. When compared with the conventional case in which the line recognition is carried out at a time for a sequence of patterns according to the overall vector data of the drawing, the above provision facilitates the line type recognition process and makes it possible to easily add a new item and to simply modify any item in reference features of line type pattern data. Consequently, it is possible to arbitrarily expand the range of recognizable line types.

(Symbol Recognition Method of the Present Invention)

Referring next to FIGS. 14 to 20, description will be given of an embodiment of the symbol recognition method according to the present invention. The method is employed to recognize symbols drawn in a map and can be executed in a CAD system shown in FIG. 2.

First, when the vector generation is finished for the binary image data attained by supplying a map to the system, the operator registers symbol features for predetermined symbols contained in the drawing. When specifying a symbol for registration, the operator first encloses the symbol in a frame in the screen image of the CRT display 14 and then inputs a name thereof to the system (step 202). The system then extracts a feature of the specified symbol (step 204) and stores the feature as symbol knowledge in the symbol knowledge base 36 to be incorporated in the data base (step 206). In this fashion, to register symbols to the system in this embodiment, the operator need only enclose a symbol in a frame in relation to raster data and hence the registration process can be easily conducted. In this regards, the symbol features include the area, moment, circumscribed rectangle, coefficients of Fourier expansion of a contour line, etc. Although the area, moment, and circumscribed rectangle are obtained from the element file 22, the coefficients of Fourier expansion of the contour line are on the other hand extracted from the contour line data linked with the element data in this process. The coefficients obtained by executing the Fourier expansion of the contour line express a feature of the shape of the pertinent symbol and are invariant or are kept unchanged through transformation thereof, e.g., when the symbol is enlarged or minimized. Since the symbols of maps are generally standardized in size, the coefficients of the Fourier expansion of the contour line are features most significant in the symbol recognition. However, for example, when symbols of the same type have different meanings, the size of each symbol is required to be taken into consideration for an appropriate recognition thereof. Therefore, the features include the area and circumscribed rectangle etc.

Furthermore, when the symbol includes a plurality of constituent elements, the system extracts the feature for each constituent element and a relative positional relationship of each constituent element relative to the other elements at the same time. The positional relationship specifies the directions of the other constituent elements with respect to a constituent element. In this embodiment, for example, the relative positional relationship includes eight partitions as shown in FIG. 15B. Each constituent element is assigned with values "1", "2", "3", . . . , and "8" in association with presence of the other elements respectively in the right, upper-right, just above, upper-left, . . . , and lower-right positions of the pertinent element. Additionally, when the other constituent element includes the constituent element or is included therein, the condition is separately specified. As can be seen from FIG. 15A, in a case of a symbol including a Chinese letter "保" enclosed in a circle, the symbol includes three elements "亻", "呆", and the circle. Value "1" is designated for element "亻" as the relative positional relationship, and a condition that the constituent element is included in another constituent element is also specified. For constituent element "呆", value "5" and a condition that the constituent element is included in another constituent element are specified. For constituent element "circle", a condition that the constituent element includes other constituent elements is designated.

Figure 16:
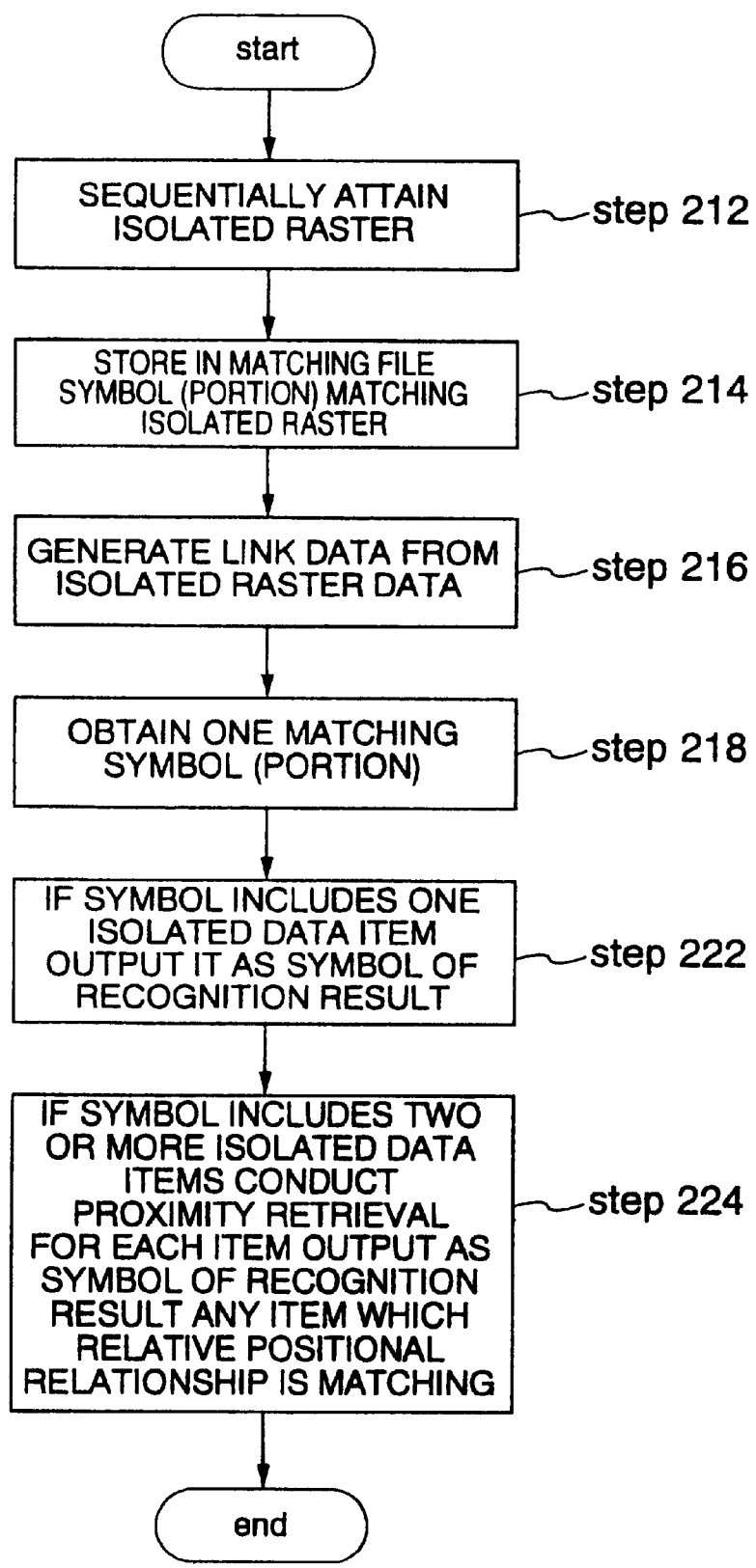
FIG. 16 is a flowchart for explaining the processing procedure to recognize a symbol.

Subsequently, the symbol recognition process is carried out. FIG. 16 shows in a flowchart the processing procedure of recognizing a symbol. First, the system sequentially obtains an isolated raster from the screen image (step 212). Next, the system attains from the element file 22 and contour line file 24 the feature of the isolated raster. If there exists a symbol (or a constituent element thereof) matching the raster with respect to the feature, the system saves the symbol (or the constituent element) in the matching file 38 (step 214). The process is repeatedly executed for all isolated rasters.

In this embodiment, whether or not the feature is matching the symbol is determined according to sum of features S, which is defined as follows.

$$S = \sum_{i=1}^{n} W_i \times M_i \quad \text{where}$$

$$M_i = 100 \times \left(1 - 2 \times \frac{|y_i - x_i|}{y_i}\right)$$

$$\sum_{i=1}^{n} W_i = 10.0$$

where, Mi (i=1, 2, . . . , n) is called normal feature and is defined according to the distance between each feature of the registered symbol (to be also referred to as "reference feature value" herebelow) yi and each feature of the recognition objective symbol (to be also referred to as "extracted feature value" herebelow) xi. In this connection, it is assumed that there exist n types of features. Normal feature Mi is "100" when the symbol registered for the feature is identical to that of the recognition object. The value is decreased as the discrepancy therebetween is increased. Additionally, Wi (i=1, 2, . . . , n) indicates weight coefficients for the respective normal features and are normalized such that the total thereof for the respective features is 10.0. Sum of features S is obtained as above in which the results attained by multiplying normal features Mi respectively by weight coefficients Wi are totaled for all features. When the sum of features S is equal to or more than a predetermined threshold value T, the symbol of the recognition object is assumed to match the registered symbol. When the sum of features S is less than the threshold value T, these symbols are considered to be different from each other. The reason why the weight coefficients are multiplied in this way is that the precision of recognition is increased and the recognition is facilitated by changing the weight of recognition for each feature. Basically, the coefficients of the Fourier expansion of the contour line are set to values larger than those of the other features. In addition, one symbol of the recognition object is actually compared with a plurality of symbols registered for recognition. Consequently, there possibly occurs a case in which the symbol of the recognition object is assumed to match a plurality of symbols registered. On this occasion, the registered symbol having the largest value of sum of features S is assumed to be the final symbol resultant from the recognition.

Subsequently, the system creates link data in the grid format according to isolated raster data (step 216). Namely, as can be seen from FIG. 15A, the screen area is split into grids such that symbols (or constituent elements) near grid points are controlled as link data. In this connection, a grid point is denoted as (r,s), where r and s stand for a row number and a column number, respectively. For example, when the symbol includes a Chinese letter "保" enclosed in a circle as shown in FIG. 15A, there is produced link data indicating that "亻" and a circle are elements near grid point (4,3) and "呆" is a constituent element near grid point (4,4). Thereafter, the system obtains one matching symbol (or constituent element) from the matching file 38 (step 218). When the symbol (or constituent element) includes one isolated data item, the symbol is outputted as the final result of recognition (step 222). On the other hand, when the symbol includes two or more isolated data items, the system conducts a proximity retrieval for each of the items according to link data. When the item is a portion of the pertinent symbol and the matching of the relative positional relationship is obtained for the item, the system outputs the item as the final symbol (step 224). After this point, the process is repetitiously executed for all symbols (constituent elements) stored in the matching file 38.

Figure 17:
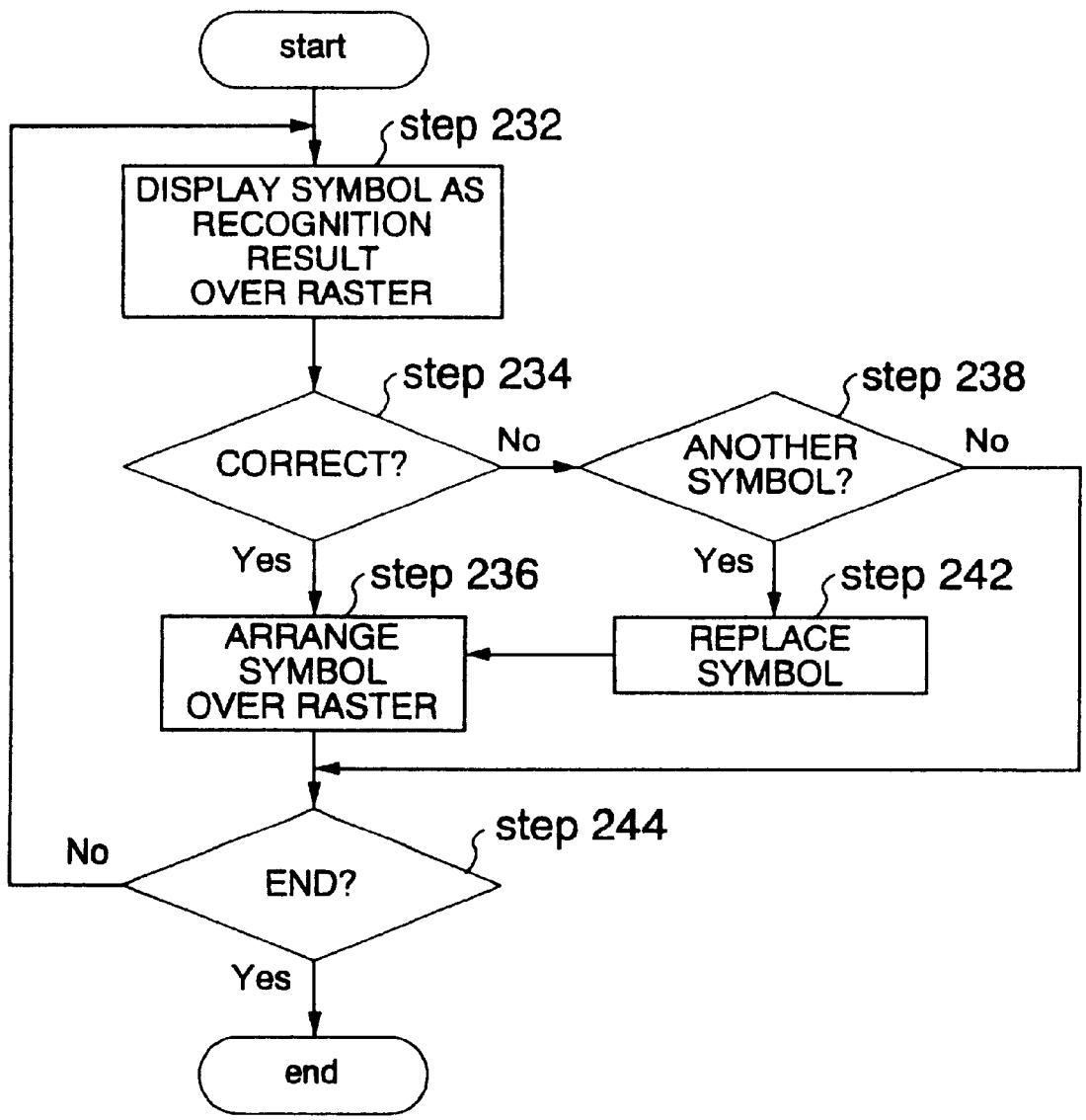
FIG. 17 is a flowchart for explaining the processing procedure to interactively edit the result obtained by recognizing the symbol.

Next, the system interactively edits the recognition results. FIG. 17 is a diagram for explaining the processing procedure to interactively edit the symbols resultant from the recognition. The symbols as the recognition results are obtained in the symbol-by-symbol manner to be displayed in the screen image of the CRT display 14, the symbol being superimposed on the raster (step 232). The operator judges to decide whether or not the symbol is correct (step 234). Judging that the symbol is correct and assuming that the recognition has been successfully finished, the operator depressed "Register" button displayed on the screen and then the symbol is arranged on the raster (step 236). On the other hand, judging that the symbol is incorrect, the operator decides whether or not there exists any other correct symbol registered in relation to the raster (step 238). If this is the case, assuming that an erroneous recognition has been conducted, the operator replaces the symbol with the correct symbol (step 242) and depresses "Register" button such that the appropriate symbol is arranged on the raster (step 236). Otherwise, assuming that an undesired item has been recognized, the operator pushes "Cancel" button presented on the screen to cancel the recognition result. When there exists another symbol as the recognition result (step 244), control is passed to step 232 to similarly conduct the editing operation for each symbol in the interactive manner. Moreover, for any symbol which has not been recognized in the symbol recognition process, i.e., for which the recognition has failed, the operator may select in the screen a predetermined symbol not registered to dispose the symbol on the raster. According to the embodiment described above, for each recognized symbol, the operator can check the correctness thereof and/or can conduct replacement thereof while comparing the symbol with data on the raster. This facilitates the editing operation done by the operator.

At this point, information related to the results of the editing operation is stored in the edited result storage 42. The information includes information items of registered symbols classified as follows, i.e., symbols successfully recognized, symbols replaced by the operator with erroneously recognized symbols, and symbols selected by the operator since recognition thereof has failed.

Next, description will be given of the processing procedure of updating the features and weight coefficients of registered symbols. When recognizing a symbol in this embodiment, the normal feature is multiplied by weight coefficients and then the sum of the results of the multiplication is calculated for the respective features to conduct the symbol recognition according to the obtained sum of features. Therefore, the system updates in this process the weight coefficients together with the features. This is because the recognition is facilitated by updating weights for recognition in relation to the respective features depending on the edited results.

Figure 18:
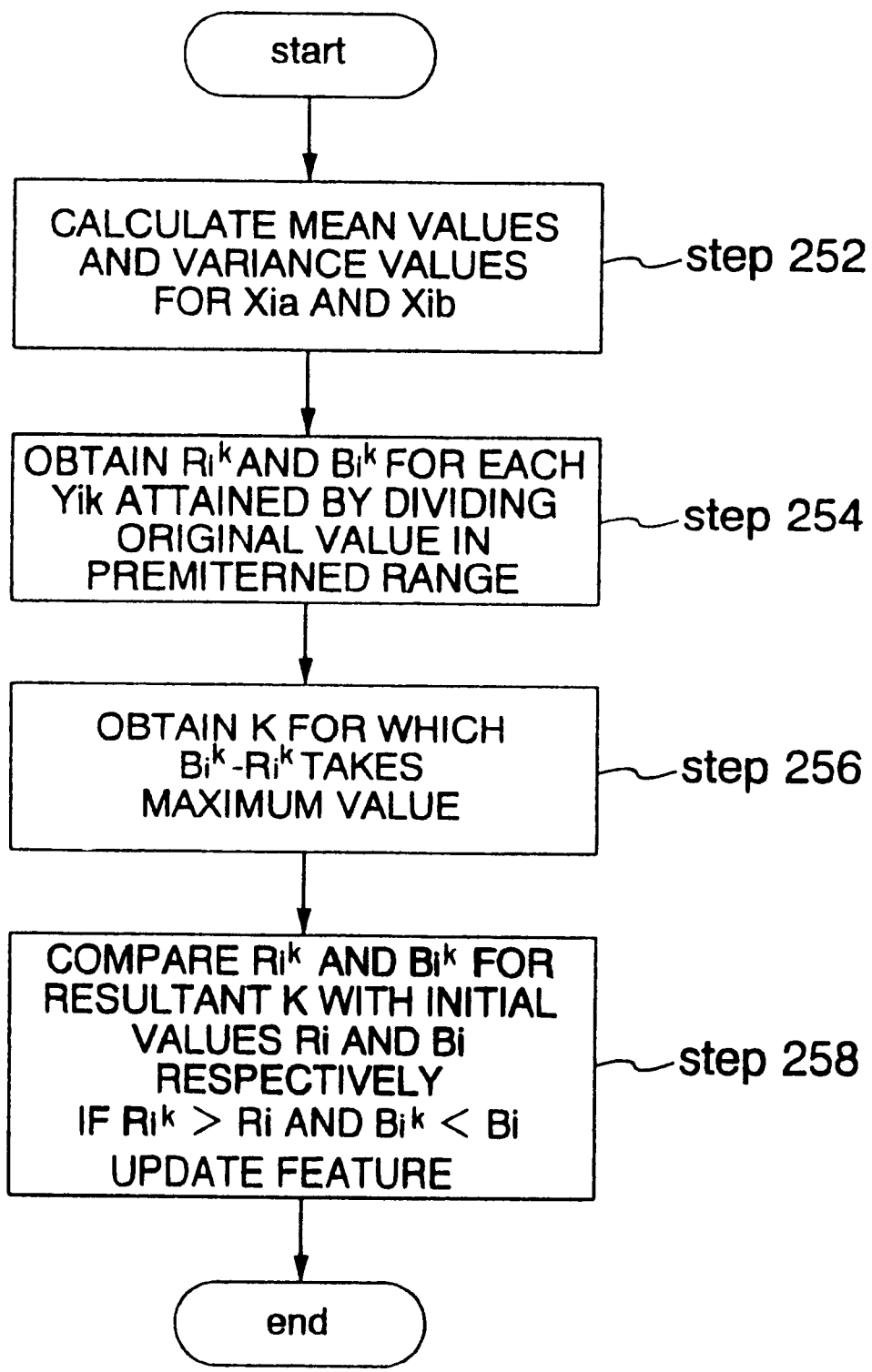
FIG. 18 is a flowchart for explaining the processing procedure to update the symbol feature.

Description will be first given of the process to update features of registered symbols. FIG. 18 shows a flowchart to explain the processing procedure to update symbol features. According to information stored in the edited result storage 42, the symbols of recognition results can be classified into three types. Assume that features of symbols successfully recognized are expressed as $x_{ia}$ (i=1, 2, . . . , n; a=1, 2, . . . , L), those symbols for which the recognition has failed and which are specified by the operator are represented as $x_{ib}$ (i=1, 2, . . . , n; b=1, 2, . . . , M), and those symbols which have been erroneously recognized as registered symbols and which have been replaced with other symbols registered are designated as $x_{ic}$ (i=1, 2, . . . , n; c=1, 2, . . . , N). Subscript i stands for the types of features and there are employed n feature types. Additionally, subscripts a, b, and c are used for discrimination between the symbols for each feature type and there exists L, M, and N symbols for the respective types.

In this connection, the update operation of normal feature is formulated to obtain reference features $y_i$ as follows.

$$\text{minimize:} \quad R_i = \sum_{a=1}^{L} R_{ia} + \sum_{b=1}^{M} R_{ib};$$

-continued $$R_{ia} = \left\| \frac{x_{ia} - y_i}{y_1} \right\|, R_{ib} = \left\| \frac{x_{ib} - y_i}{y_i} \right\|$$

$$\|X\| \rightarrow \text{Norm of } X$$

$$\text{maximize:} \quad B_1 = \sum_{c=1}^{N} B_{ic}; B_{ic} = \left\| \frac{x_{ic} - y_i}{y_i} \right\|$$

In other words, for the features $x_{ia}$ of symbols successfully recognized and the features $x_{ib}$ of symbols for which the recognition has failed, the ratios $R_{ia}$ and $R_{ib}$ representing ratios of distances respectively thereof relative to reference features $y_i$ are totaled for the respective symbols to attain $R_i$. For the features $x_{ic}$ of symbols erroneously recognized, the ratios $B_{ic}$ representing the ratios of distance thereof relative to reference features $y_i$ are totaled for the respective symbols to attain $B_i$. It is only necessary to obtain the features $y_i$ which minimize $R_i$ and which maximizes $B_i$.

For this purpose, the initial values of $R_i$ and $B_i$ are attained according to the reference features $y_i$ before the update process and then there are calculated the mean value and variance of the features $x_{ia}$ of symbols successfully recognized and the features $x_{ib}$ of symbols for which the recognition has failed as follows (step 225).

$$\text{Mean value } \bar{x}_i = \frac{\theta + \sum_{a=1}^{L} x_{ia} + \sum_{b=1}^{M} x_{ib}}{t + L + M}$$

$$\text{Variance } \bar{\sigma}_i = \frac{\sqrt{\Psi + \sum_{a=1}^{L} (x_{ia} - \bar{x}_i)^2 = \sum_{b=1}^{L} (x_{1b} - \bar{x}_i)^2}}{t + L + M - 1}$$

where, $\Theta$ indicates the mean value of the accumulated result of t preceding items and $\psi$ designates the variance of the accumulated result of t preceding items. However, the variance cannot be appropriately obtained. Next, each reference feature is divided, e.g., by 11 in a range $$\left[ \bar{x}_i - \frac{\bar{\sigma}_i}{2}, \bar{x}_i + \frac{\bar{\sigma}_i}{2} \right]$$

according to the mean value and variance as follows.

$$y_{ik} = \bar{x}_i - \frac{\bar{\sigma}_i}{2} + k \times \frac{\bar{\sigma}_i}{10} \quad (k = 0, 1, 2, \ldots, 10)$$

For the obtained reference feature $y_{ik}$ (k=0, 1, 2, . . . , 10), the system calculates 11 values respectively of $R_i^k$ and $B_i^k$ (step 254). The system then obtains k=$k_m$ which maximize $B_i^k - R_i^k$ (step 258). Thereafter, $R_i^k$ and $B_i^k$ for the obtained k=$k_m$ are respectively compared with the initial values $R_i$ and $B_i$. When $R_i^k$ is more than the initial value $R_i$ and $B_i^k$ is less than the initial value $B_i$, the system updates the original reference value $y_i$ and variance as follows (step 258).

$$y_{ik_m} = \bar{x}_i - \frac{\bar{\sigma}_i}{2} + k_m \times \frac{\bar{\sigma}_i}{10}, \sigma_i = \bar{\sigma}_i$$

On the other hand, for the obtained k=$k_m$, when $R_i^k$ is equal to or less than the initial value $R_i$ or when $B_i^k$ is equal to or more than the initial value $B_i$, the system does not update the original reference value because the recognition precision is not improved.

Figure 19:
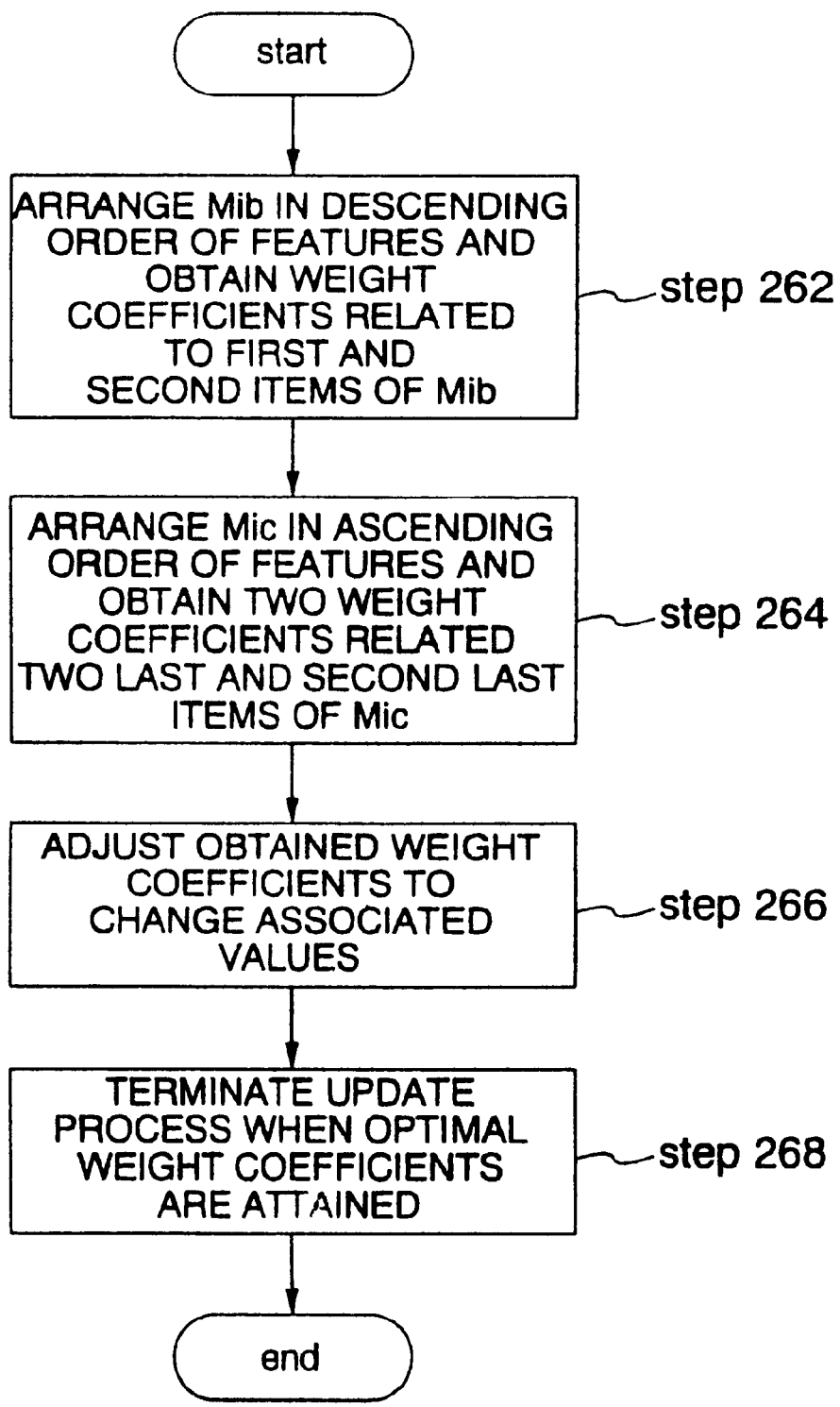
FIG. 19 is a flowchart for explaining the processing procedure to update weight coefficients.
Figure 20:
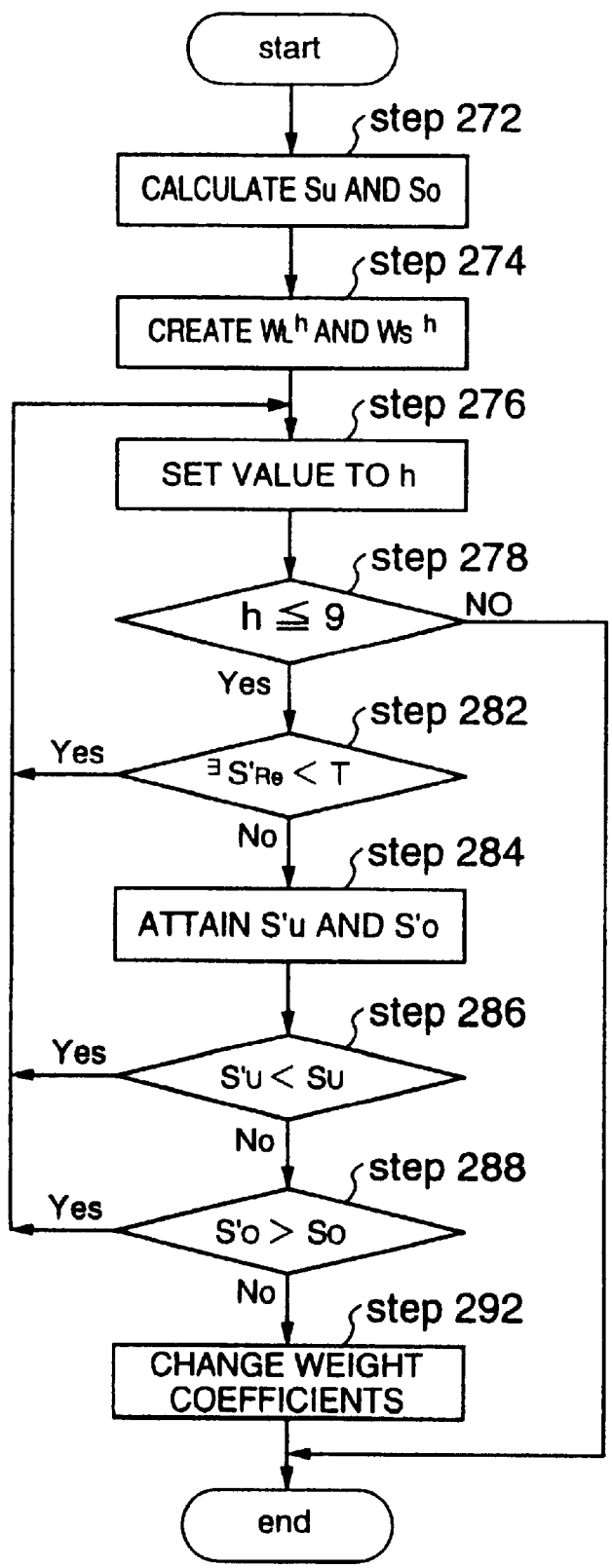
FIG. 20 is a flowchart for explaining the processing procedure to update weight coefficients.

As above, after the reference features are updated, the weight coefficients associated with this respective features are updated. FIGS. 19 and 20 are flowcharts for explaining the processing procedure to update the weight coefficients. The update process is accomplished according to the updated reference features. Assume that the sum of features of symbols successfully recognized is indicated as $S_{Ra}$ (a=1, 2, ..., L), that the sum of features of symbols for which the recognition has been failed is denoted as $S_{Ub}$ (b=1, 2, ..., M), and that the sum of features of symbols erroneously recognized is represented as $S_{Oc}$ (c=1, 2, ..., N). These sums are related with each other as $S_{Ra} \geq T$, $S_{Ub} < T$, and $S_{Oc} \geq T$. The update of the weight coefficient is formulated to obtain weight coefficients $W'_i$ (i=1, 2, ..., n) which increases $S_{Ub}$ to be equal to or more than the threshold value T and which decreases $S_{Oc}$ to be less than the threshold value T without reducing $S_{Ra}$ to be equal to or less than the threshold value T as follows.

$$S_{Ra} = \sum_{i=1}^{n} W_i \times M_{ia} \geq T \rightarrow S'_{Ra} = \sum_{i=1}^{n} W'_i \times M_{ia} \geq T$$

$$S_{Ub} = \sum_{i=1}^{n} W_i \times M_{ib} < T \rightarrow S'_{Ub} = \sum_{i=1}^{n} W'_i \times M_{ib} \geq T$$

$$S_{Oc} = \sum_{i=1}^{n} W_i \times M_{ic} \geq T \rightarrow S'_{Oc} = \sum_{i=1}^{n} W'_i \times M_{ic} < T$$

$$\text{condition:} \quad \sum_{i=1}^{n} W_i = \sum_{i=1}^{n} W'_i = 10.0$$

First, according to the sum of features $S_{Ub}$ of symbols for which the recognition has failed, the reference features $M_{ib}$ having a significant influence on the effect of minimizing $S_{Ub}$ to be less than T are ordered. That is, reference features $M_{ib}$ are sequentially arranged in a descending order of the respective features and then weight coefficients respectively of the first and second items are indicated as $W^1_{Large}$ and $W^2_{Large}$ (step 262). In addition, according to the sum of features $S_{Ub}$ of symbols erroneously recognized, the reference features $M_{ic}$ having a small influence on the effect of minimizing $S_{Ob}$ to be equal to or more than T are ordered. Namely, reference features $M_{ic}$ are arranged in an ascending order of the respective features and then weight coefficients respectively of the last and second last items are indicated as $W^1_{small}$ and $W^2_{Small}$ (step 264). In the process of updating weight coefficients, the weight coefficients $W^t_{Large}$ (t=1 and 2) and $W^t_{Small}$ (t=1 and 2) are respectively increased and decreased by an identical quantity respectively for each set of the weight coefficients in consideration of the condition to normalize the weight coefficients as follows (step 266). In this regard, the other weight coefficients are kept unchanged in the operation.

First, the process is executed for the first set ($W^1_{Large}$, $W^1_{Small}$) For simplicity of explanation, assume $W_L = W^1_{Large}$ and $W_S = W^1_{Small}$ in this case. Using first the weight coefficient $W_i$ before the update operation, the system totals in step 272 the sums of features $S_{Ub}$ for the respective symbols $$S_U = \sum_{b=1}^{M} \sum_{i=1}^{n} W_i \times M_{ib}$$

and the sums of features $S_{Ob}$ for the respective symbols $$S_O = \sum_{b=1}^{M} \sum_{i=1}^{n} W_i \times M_{ic}$$

Furthermore, assuming $\rho = W_S/19$, values of $W_L$ and $W_S$ are respectively increased and decreased by $\rho \times (h+1)$ to resultantly produce $W_L^h$ and $W_S^h$ (h=0, 1, 2, ..., 9). That is, $$W_L^h = W_L + \rho \times (h+1), \quad W_S^h = W_S - \rho \times (h+1)(h = 0, 1, 2, ..., 9)$$

Moreover, in the weight coefficients $W_i$ (i=1, 2, ..., n) prior to the update operation, $W_L$ and $W_S$ are respectively replaced with $W_L^h$ and $W_S^h$ to obtain weight coefficients $W'_i$ (i=1, 2, ..., n) (step 274). Utilizing the weight coefficients $W'_i$, h is sequentially set to an integer ranging from 0 to 9 (step 276). A check is made in step 278 to decide whether or not the value of h is equal to or less than nine. If this is the case, control is transferred to step 282.

In step 282, the sum of features $S'_{Ra}$ of symbols successfully recognized are calculated according to the weight coefficients $W'_i$ for a predetermined value of h. A check is then conducted to decide whether or not there exists any $S'_{Ra}$ (a=1, 2, ..., L) which is less than the threshold value T as follows.

$$\exists S'_{Ra} = \sum_{i=1}^{n} W'_i \times M_{ia} < T$$

If any one of $S'_{Ra}$ is less than the value T, the items which have been recognized cannot be any more recognized and hence the recognition precision is lowered. In consequence, control is passed to step 276. On the other hand, when each value of $S'_{Ra}$ is equal to or more than the threshold value T, the system totals, in step 284 according to the weight coefficients $W'_i$, the sums of features $S'_{Ub}$ for the respective symbols $$S'_U = \sum_{b=1}^{M} \sum_{i=1}^{n} W'_i \times M_{ib}$$

and the sums of features $S'_{Ob}$ for the respective symbols $$S'_O = \sum_{c=1}^{N} \sum_{i=1}^{n} W'_i \times M_{ic}$$

Comparing S'U with the initial value SU, the system decides whether or not $S'_U < S_U$ holds (step 286). If $S'_U$ is less than $S_U$, the recognition precision cannot be considered to be improved for the symbols for which the recognition has failed and hence control is transferred to step 276. On the other hand, if $S'_U$ is equal to or more than $S_U$, $S'_o$ is compared with $S_o$ to determine whether or not $S'_o > S_o$ is satisfied (step 288). If this is the case, there exists a possibility that an erroneously recognized symbol may possibly be erroneously recognized again. Therefore, control is passed to step 276. On the other hand, when $S'_o$ is equal to or less than $S_o$, $W_L$ and $W_S$ related to the weight coefficients $W_i$ are respectively replaced with $W_L^h$ and $W_S^h$ for the value of h in the situation to resultantly replace $W_i$ with $W'_i$ (step 292), thereby terminating the flowchart of FIG. 20. Incidentally, if the items respectively satisfying the predetermined conditions are missing in steps 282, 286, and 288 even when the process is repeatedly conducted for all values of h, the weight coefficients are not changed.

Next, the process executed for the first group ($W^1_{Large}$, $W^1_{Small}$) is similarly accomplished for the second group ($W^2_{Large}$, $W^2_{Small}$). When the optimal weight coefficients are obtained, the update process is terminated (step 268).

In the symbol recognition method of this embodiment, the symbols recognized are interactively edited to be classified into symbols successfully recognized, symbols for which the recognition has failed, and symbols erroneously recognized. According to the edited results, there are attained new features which minimize the distances respectively relative to the symbols successfully recognized and symbols for which the recognition has failed and which maximize the distance relative to the symbols erroneously recognized, thereby updating the features of the registered symbols to obtain a higher recognition precision. In addition, after the features of the registered symbols are updated, there are obtained new weight coefficients which increase the sum of features of the symbols for which the recognition has failed and which decreases that of the sum features of the symbols erroneously recognized without reducing the sum of features of the symbols successfully recognized to be less than the threshold value in the reduction thereof. With this provision, the weight coefficients can also be updated to attain a higher recognition precision. In consequence, after these update operations, when there is conducted a learning operation of the previously recognized results, the symbols for which the preceding recognition failed or which are erroneously recognized can be appropriately recognized and hence the recognition precision is improved.

In this embodiment, the update operation is effected only for two groups ($W^1_{Large}$, $W^1_{Small}$) and ($W^2_{Large}$, $W^2_{Small}$). However, three or more groups may be specified for the update operation of the weight coefficients.

According to the symbol recognition method of the present invention described above, after memorizing the editing results indicating whether or not the pertinent symbols have been successfully recognized, the features of the registered symbols are updated according to the edited results thus memorized. By conducting a learning operation for the recognized results, the recognition precision can be improved in the symbol recognition method.

Additionally, according to the edited results obtained by editing and classifying the recognized symbols into symbols successfully recognized, symbols for which the recognition has failed, and symbols erroneously recognized, there are attained new features which minimize the distances respectively relative to the symbols successfully recognized and symbols for which the recognition has failed and which maximize the distance relative to the symbols erroneously recognized. With this provision, there is provided a symbol recognition method capable of updating the features of the registered symbols to obtain a higher recognition precision.

Furthermore, the normal feature generated according to the distance between the feature of the registered symbols and those of the symbol as the recognition object is multiplied by the weight coefficients such that the results of multiplication are totaled for each feature to produce the sum of features. When the sum of features is equal to or more than a predetermined threshold value, the symbol is regarded as the registered symbol. Therefore, it is possible to provide a symbol recognition method in which the symbol recognition is facilitated by altering the recognition weight for each feature.

(House Recognition Method of the Present Invention)

Figure 22:
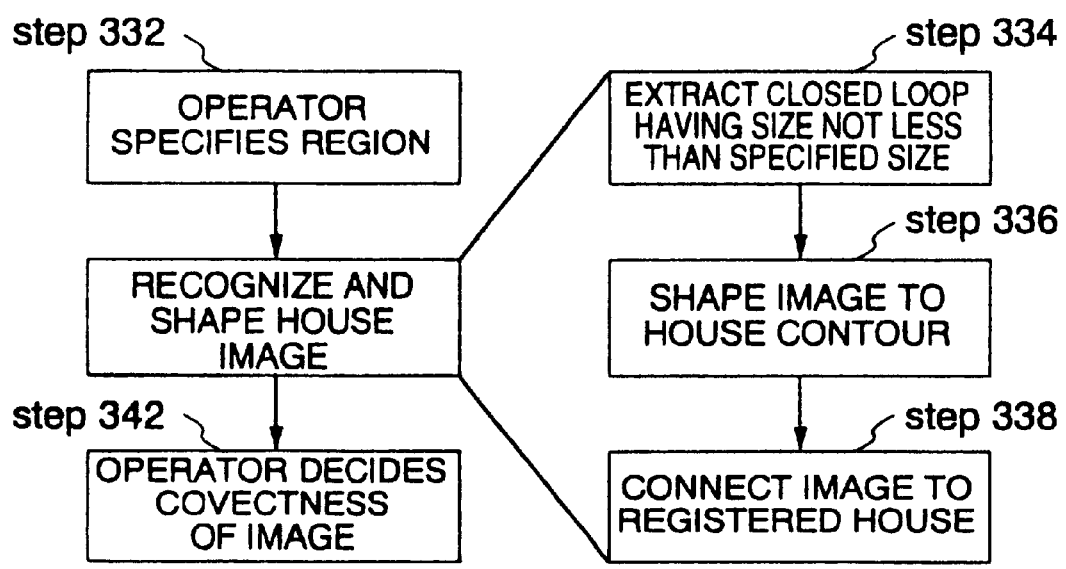
FIG. 22 is a flowchart for explaining an embodiment of the house recognition method in a map input system according to the present invention.

Subsequently, description will be given of the house recognition method according to the present invention with reference to FIGS. 21 to 23. This method is employed to recognize a house drawn in a map and can be executed in the CAD shown in FIG. 2.

First, referring to the flowchart of FIG. 4, the drawing is read by the scanner 12 to create raster data (step 2). For example, assume that there is produced raster data of four house patterns shown in FIG. 21A. The central processor 18 conducts the labeling process according to the raster data, extracts a feature for each pattern element labeled to create element data, and then stores the data in the element file 22. In addition, for each pattern element, the processor 18 obtains edges of the raster data to produce contour line data and stores the data in the contour line file 24 (step 4). The processor 18 then creates region data according to the contour line data to manage in a tree structure information related to the circumscribed rectangle of each of the line segments constituting the contour line (step 6).

Next, the center line generation is interactively achieved for the pattern to be recognized. In this connection, the center line generation includes a process to obtain, for example, a line establishing a connection between the centers of circles inscribed on two line segments. First, the operator picks by the pointing device 16 a predetermined region on the screen of the CRT display 14 to specify a pair of line segments for recognition (step 8). In this case, as can be seen from FIG. 21A, it is assumed that the operator specifies two line segments $S_{31}$ and $S_{32}$ substantially parallel to each other over the house pattern on the left-hand side. In response thereto, as shown in FIG. 21B, the system makes a search through the region management tree to detect a leaf corresponding to the predetermined region R3 denoted on the screen (FIG. 21C, step 12). Thereafter, according to the pointer memorized in the leaf, the system extracts from the contour line file 24 contour line data associated with line segments $S_{31}$ and $S_{32}$ (step 14). Next, the system carries out the center line creation for the extracted line segments $S_{31}$ and $S_{32}$ to produce a center line as shown in FIG. 21D (step 16). After the operation in which the center line is created according two line segments according to the specified region, the system executes a trace operation for the two line segments to continuously generate another center line. In short, since the contour line is one successive line, the system automatically acquires directly from the contour line file 24 line segments of the contour line, the line segments connected to line segments $S_{31}$ and $S_{32}$ just undergone the center line generation in a predetermined direction, for example, toward the left in FIG. 21A. The system creates a center line to resultantly produce a polygonal line (step 18). In this process, when the position to be processed is a crosspoint, a corner, or the like of the house pattern, there is not produced such a center line and hence the center line generation is stopped. Thereafter, when the operator specifies from the pointing device 16 a pair of line segments for the subsequent recognition, for example, two line segments $S_{33}$ and $S_{34}$ substantially parallel to each other on the left side of the house image on the upper-left corner, the center line creation is similarly accomplished for these lines. In this way, the center line production is carried out for the overall raster data. Vector data resultant from the center line generation is stored in the vector file 28 (step 22).

Figure 23A:
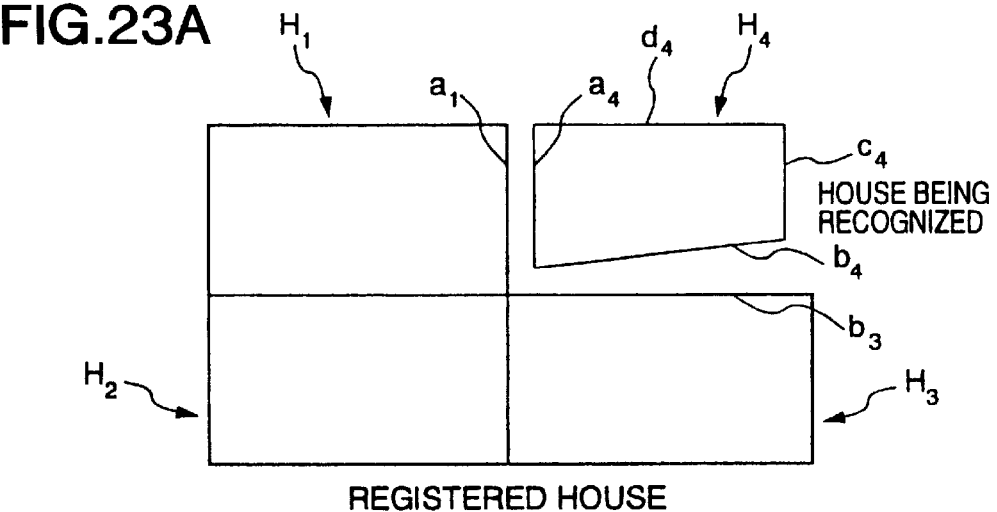
FIGS. 23A to 23C are diagrams for explaining the element connecting process.
Figure 23B:
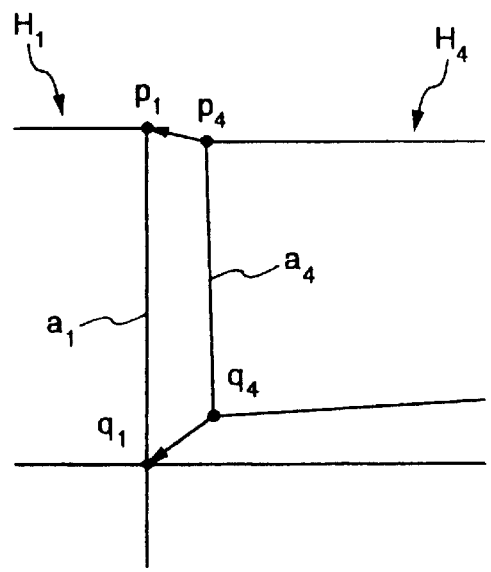

Next, the house recognition is conducted for a specific house pattern. Assume in this situation that commands are selected to execute also the connection process in the house recognition. First, the operator sets by the pointing device 16 a frame on the screen of the CRT display 14 to designate a region of the range (step 332 of FIG. 22). In this case, for simplicity of explanation, it is assumed that the operator specifies a region including only house pattern $H_4$ on the upper-right corner as shown in FIG. 23A. Moreover, assume that house patterns $H_1$, $H_2$, and $H_3$ in the neighborhood of house pattern $H_4$ have beforehand been registered. When the region is specified in step 332, the system extracts an image from the specified region, the image having a looped contour and a size equal to or more than a predetermined size (step 334). Since the house pattern is generally a closed simple pattern such as a rectangle, the above pattern having the closed loop is regarded as a house pattern to be recognized. Additionally, since each pattern has a certain size in a map, the system extracts patterns having a size not less than a preset size. With this provision, such small images included in the frame as those generally used in maps can be removed from the items to be extracted, thereby efficiently acquiring house patterns for recognition. Thereafter, the system shapes the extracted house patterns, for example, to straighten side lines and/or to transform chamfered portions into corners so as to thereby obtain a house contour (step 336).

Subsequently, the system conducts the connection process of the pertinent house pattern with respect to the house patterns already registered (step 338). First, for each side edge of house pattern $H_4$, the system selects one of the registered house patterns which has the shortest distance thereto in a predetermined range. For example, house pattern $H_1$ is chosen for edge a4 of house pattern $H_4$. The system then checks to determine whether or not there exists edge of the registered house pattern $H_1$ which is substantially parallel to edge $a_4$ of house pattern $H_4$ and which has a distance thereto equal to or less than a predetermined distance. In this regard, the distance is set to, e.g., several pixels, namely, about 0.3 millimeter (mm) to about 0.4 mm. Specifically, in consideration of the line type, i.e., a bold line or an ordinary line, the distance is designated with a ratio thereof relative to the line width. Actually, even when two edges are shifted about 0.3 mm to about 0.4 mm from each other, the effect thereof is not clear when viewed by humans. However, the effect of the shift therebetween is clear when the image is enlarged on the screen. The connection process is effective in a case in which, for example, the area of a lot is to be calculated and/or the data is actually used as numeric values.

Figure 23C:
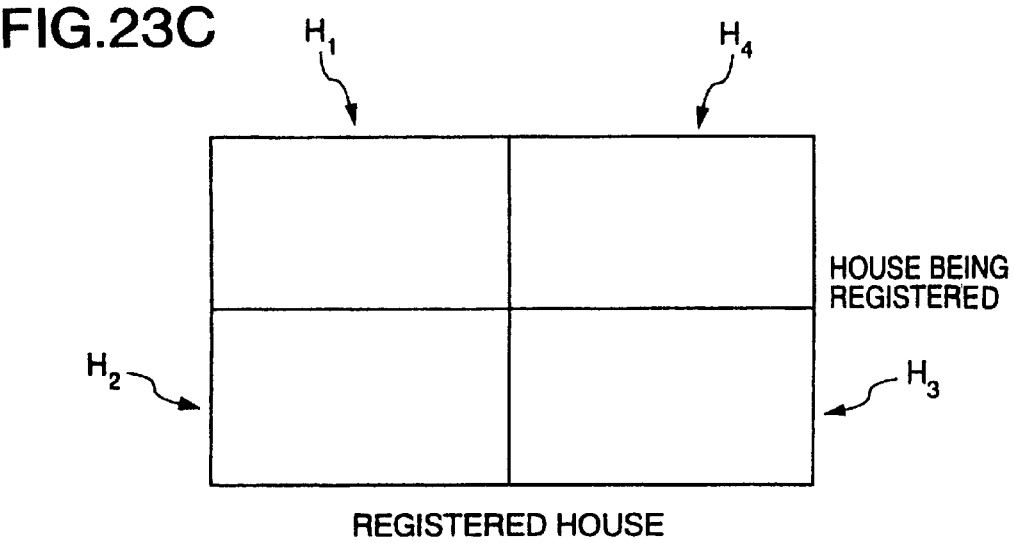

When there exists for edge $a_4$ of house pattern $H_4$ any edge of registered house pattern $H_1$ which is substantially parallel thereto and which has a distance thereto equal to or less than the predetermined distance, the system decides the edge for connection. In this case, edge $a_1$ of house pattern $H_1$ is selected as the connecting edge. As can be seen from FIG. 23B, the system then expands, contracts, and/or moves edge a4 of house pattern $H_4$ so that points $p_4$ and $q_4$ at both ends of edge $a_4$ of house pattern $H_4$ respectively match points $p_1$ and $q_1$ at both ends of edge a1 of house pattern $H_1$, thereby coupling edge $a_4$ of house pattern $H_4$ to the connecting edge. Thereafter, the above process is similarly effected in a sequential manner for the other edges $b_4$, $c_4$, and $d_4$ of house pattern $H_4$ to link edge $b_4$ of house pattern $H_4$ with edge $b_3$ of house pattern $H_3$. On the other hand, edges $c_4$ and $d_4$ of house pattern $H_4$ are not connected to any edge of the registered house pattern. However, as a result of the connection of edges $a_4$ and b4 of house pattern $H_4$, edges $c_4$ and $d_4$ are automatically expanded, contracted, and/or moved such that recognition objective pattern $H_4$ has boundaries matching those of registered house patterns $H_1$ and $H_3$ as shown in FIG. 23C.

As above, after the connection process is carried out for one house pattern as the object of recognition, the process result is presented on the screen of the display 14. Since the house recognition has been conducted for a drawing having a closed-loop contour, such patterns other than the house patterns as a circle may have been processed. To remove such an undesired result, the operator checks to determine whether or not the processed item is not a house pattern (step 342). When the item indicates a house, the operator depresses "Register" button. In response thereto, the objective house pattern is registered as a code in the vector file 28. On the other hand, when the processed pattern is other than a house pattern or is not required to be registered, the operator pushes "Cancel" button displayed on the screen to cancel the registration thereof. Additionally, when the region designated by the frame contains any other house pattern for recognition, the shaping process (step 336) and connection process (step 338) are similarly achieved for the pattern and then the process result is displayed on the screen of the CRT display 14. The operator then judges the correctness of the result.

Thereafter, the system accomplishes the symbol recognition for symbols included in the map and then carries out the structure forming or deciding process in an interactive manner to store the resultant structured data in the structured file 32. In this connection, the symbol recognition process requires the element data and contour line data. Since the contour line data is linked with the element data, the system acquires the contour line via the element data in this process.

According to the house recognition method in the map data input system of this embodiment, when a frame is specified on the screen, the system extracts a recognition objective house pattern which has a closed-loop shape and a size equal to or more than a predetermined size in the frame and conducts the shaping process and connection process for the extracted house pattern and then displays the resultant pattern on the screen. Consequently, after specifying house patterns for recognition, the operator need only indicate necessity of registration of each of the patterns according to the result presented on the screen. This minimizes the burden imposed on the operator and increases the processing speed. In addition, since the operator can specify the house patterns as recognition objects in the frame, the operability is improved when compared with the interactive processing method of the conventional technology. Moreover, after the house pattern as the recognition object is shaped into a house contour, the connection process can be achieved for the house contour. Therefore, the system can automatically conduct necessary modifications for the house pattern.

In the embodiment above, in a case in which the command of the connection process is not selected in the house recognition process, it may also be possible that the system displays, when the house pattern as the recognition object is transformed into a house contour, the process result on the screen so that the operator decides the correctness thereof.

According to the house recognition method described above, when a frame is specified on the screen, the system extracts as a recognition objective house image a graphic pattern which has a closed-loop shape and a size equal to or more than a predetermined size in the frame and carries out the shaping process for the attained house pattern and then displays the pattern on the screen. Consequently, after specifying house patterns for recognition at a time, the operator need only indicate the necessity of registration for each of the patterns according to the result presented on the screen. This mitigates the burden imposed on the operator and hence the processing speed is increased.

Furthermore, after the house pattern as the recognition object is transformed into a house contour, the system can perform the connection process for the house contour, i.e., the required modifications can be automatically accomplished for the house pattern.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An interactive line-type recognizing method for recognizing interactively a line type of a line which has been specified to a pattern displayed by displaying a binary image data on a screen, comprising:

memorizing in advance a line type pattern data in which a reference feature is registered for each constituent element which constitutes a line type pattern of the each line type;

performing a labeling process based on the binary image data obtained from a drawing to generate a contour line data by taking out a contour line for each pattern according to the binary image data which is attained from the labeling process;

identifying, when a line type of an objective line to be recognized on the screen and a position of a constituent element of the objective line has been specified, a type of the constituent element of the objective line according to the contour line data; and extracting a feature for the constituent element of the objective line, and then deciding whether or not the objective line is the same as the specified line type by comparing the extracted feature with the reference feature corresponding to the objective line, wherein at least four features, including a line segment, a node, a crosspoint, and an isolated point, are used as the constitute element.

2. An interactive line type recognizing method according to claim 1, further comprising, after deciding the objective line is the same as the specified line type:

tracing a constituent element of another objective line subsequent to the constituent element of the objective line; and performing a line type recognition for the traced constituent element of the another objective line.

3. An interactive line type recognizing method according to claim 1, further comprising, after deciding the objective line is the same as the specified line type:

generating a vector data connecting the constituent element of the objective line to a constitute element of previously recognized objective line; and displaying the vector data on the screen.

4. A computer program readable by machine, embodying a program of instructions executable by the machine to perform the steps of claim 1 for interactive drawing recognition.

5. An interactive house recognizing method comprising:

obtaining a binary data from a map to be processed, performing a labeling process based on the binary image data to generate a contour line data by taking out a contour line for each pattern according to the binary image data which is attained from the labeling process, recognizing a house pattern after generating a vector data from the contour line data, extracting, when a frame is specified on a screen, a pattern in the frame as a recognition objective house pattern, the pattern having a closed-loop contour and a size not less than a predetermined size; and indicating whether or not the recognition objective house pattern is registered, after shaping the extracted recognition objective house pattern into a house contour and displaying the house contour on the screen.

6. A house recognizing method according to claim 5, further comprising, after shaping the recognition objective house pattern into the house contour, performing, when an edge of the recognition objective house pattern is shifted from an edge of already registered house pattern, a connection process of removing the shift between the edges, the edges being inherently overlapped with each other.

7. A computer program readable by machine, embodying a program of instructions executable by the machine to perform the steps of claim 5 for interactive drawing recognition.

8. An interactive symbol recognizing method in which a symbol to be registered is specified on a screen in advance, a feature for the symbol is extracted to register the symbol, and then it is decided whether or not an objective symbol is the same as the registered symbol, the method comprising:

storing an edited result of the objective symbol relating to whether or not the recognition of the objective symbol is successful;

classifying the recognized symbol into a symbol successfully recognized, a symbol for which the recognition is failed and a symbol erroneously recognized, in the edited result; and updating the feature of the registered symbol based on the edited result by obtaining a new feature which minimizes a distance relative to the symbol successfully recognized, minimizes a distance relative to the symbol for which the recognition is failed, and maximizes a distance relative to the symbol erroneously recognized.

9. An interactive symbol recognizing method according to claim 8, further comprising deciding that the objective symbol is the registered symbol when a sum of the features is equal to or more than a predetermined threshold value, the sum of the features being obtained by totaling for each feature a result of multiplication in which a normal feature is multiplied by a weight coefficient, the normal feature being generated based on the distance between the feature of the registered symbol and the feature of the objective symbol.

10. An interactive symbol recognizing method according to claim 9, comprising, after said updating, updating the weight coefficient by obtaining a new weight coefficient which increases the sum of the features for the symbol for which the recognition is failed and decreases the sum of the features for the symbol erroneously recognized, without decreasing the sum of the features for the symbol successfully recognized less than the threshold value.

11. An interactive symbol recognizing method according to claim 8, wherein the feature is an area, a moment, a circumscribed rectangle and coefficients of Fourier expansion of the contour line.

12. A computer program readable by machine, embodying a program of instructions executable by the machine to perform the steps of claim 8 for interactive drawing recognition.

13. An interactive house recognition processing apparatus comprising:

an image input device for reading a drawing and a obtaining a binary data from the drawing:

a central processor for performing a labeling process based on the binary image data, a generating process of generating a vector data from a contour line data, and a pattern extracting process for extracting a pattern in a frame as a recognition objective house pattern; and wherein the central processor references the labeled binary data to generate the contour line data and shapes the extracted recognition objective house pattern into a house contour and displays the house contour on the screen.

14. An interactive house recognition processing apparatus according to claim 13 wherein, after the recognition objective house pattern is shaped into the house contour, the central processor performs a connection process for removing a shift between edges of the recognition objective house pattern and already registered house patterns.

15. A computer program product comprising:

a computer usable medium having computer readable program code embodied therein for an interactive house recognizing method, the computer readable program code in the computer program product comprising:

computer readable program code for causing a computer to obtain binary image data from a map to be processed, computer readable program code for causing a computer to perform a labeling process based on the binary image data to label pattern elements and to generate contour line data by taking out a contour line for each pattern element according to the binary image data, computer readable program code for causing a computer to register a house pattern for each pattern element;

computer readable program code for causing a computer to extract, when a frame is specified on a screen, a pattern in the frame as a recognition objective house pattern, the pattern having a closed-loop contour and a size not less than a predetermined size;

computer readable program code for causing a computer to shape the extracted recognition objective house pattern into a house contour and displaying the house contour on a screen; and computer readable program code for causing a computer to indicate whether or not the recognition objective house pattern is registered.

16. A computer program product comprising:

a computer usable medium having computer readable program code embodied therein for interactive line-type recognizing method for recognizing interactively a line type of a line which has been specified to a pattern displayed by displaying a binary image data on a screen, the computer readable program code in the computer program product comprising:

computer readable program code for causing a computer to memorize in advance a line type pattern data in which a reference feature is registered for each constituent element which constitutes a line type pattern of the each line type;

computer readable program code for causing a computer to perform a labeling process based on the binary image data obtained from a drawing to generate a contour line data by taking out a contour line for each pattern attained from the labeling process according to the binary image data;

computer readable program code for causing a computer to identify, when a line type of an objective line to be recognized on the screen and a position of a constituent element of the objective line has been specified, a type of the constituent element of the objective line according to the contour line data; and computer readable program code for causing a computer to extract a feature for the constituent element of the objective line, and then decide whether or not the objective line is the same as the specified line type by comparing the extracted feature with the reference feature corresponding to the objective line, wherein at least four features, including a line segment, a node, a crosspoint, and an isolated point, are used as the constitute element.

17. A program storage device readable by machine, tangibly embodying a program of instructions executable by the machine to perform method steps for recognizing interactively a line type of a line which has been specified to a pattern displayed by displaying a binary image data on a screen, the method steps comprising:

memorizing in advance a line type pattern data in which a reference feature is registered for each constituent element which constitutes a line type pattern of the each line type;

performing a labeling process based on the binary image data obtained from a drawing to generate a contour line data by taking out a contour line for each pattern according to the binary image data which is attained from the labeling process;

identifying, when a line type of an objective line to be recognized on the screen and a position of a constituent element of the objective line has been specified, a type of the constituent element of the objective line according to the contour line data; and extracting a feature for the constituent element of the objective line, and then deciding whether or not the objective line is the same as the specified line type by comparing the extracted feature with the reference feature corresponding to the objective line, wherein at least four features, including a line segment, a node, a crosspoint, and an isolated point, are used as the constitute element.

18. A program storage device readable by machine, tangibly embodying a program of instructions executable by the machine to perform method steps for interactive house recognition, the method steps comprising:

obtaining a binary data from a map to be processed;

performing a labeling process based on the binary image data to generate a contour line data by taking out a contour line for each pattern according to the binary image data which is attained from the labeling process;

recognizing a house pattern after generating a vector data from the contour line data;

extracting, when a frame is specified on a screen, a pattern in the frame as a recognition objective house pattern, the pattern having a closed-loop contour and a size not less than a predetermined size; and indicating whether or not the recognition objective house pattern is registered, after shaping the extracted recognition objective house pattern into a house contour and displaying the house contour on the screen.

19. A program storage device readable by machine, tangibly embodying a program of instructions executable by the machine to perform method steps for interactive symbol recognition in which a symbol to be registered is specified on a screen in advance, a feature for the symbol is extracted to register the symbol, and then it is decided whether or not an objective symbol is the same as the registered symbol, the method steps comprising:

storing an edited result of the objective symbol relating to whether or not the recognition of the objective symbol is successful;

classifying the recognized symbol into a symbol successfully recognized, a symbol for which the recognition is failed and a symbol erroneously recognized, in the edited result; and updating the feature of the registered symbol based on the edited result by obtaining a new feature which minimizes a distance relative to the symbol successfully recognized, minimizes a distance relative to the symbol for which the recognition is failed, and maximizes a distance relative to the symbol erroneously recognized.

20. An apparatus for recognizing interactively a line type of a line which has been specified to a pattern displayed by displaying a binary image data on a screen, comprising:

means for memorizing in advance a line type pattern data in which a reference feature is registered for each constituent element which constitutes a line type pattern of the each line type;

means for performing a labeling process based on the binary image data obtained from a drawing to generate a contour line data by taking out a contour line for each pattern according to the binary image data which is attained from the labeling process;

means for identifying, when a line type of an objective line to be recognized on the screen and a position of a constituent element of the objective line has been specified, a type of the constituent element of the objective line according to the contour line data; and means for extracting a feature for the constituent element of the objective line, and then deciding whether or not the objective line is the same as the specified line type by comparing the extracted feature with the reference feature corresponding to the objective line, wherein at least four features, including a line segment, a node, a crosspoint, and an isolated point, are used as the constitute element.

21. An apparatus for symbol recognition in which a symbol to be registered is specified on a screen in advance, a feature for the symbol is extracted to register the symbol, and then it is decided whether or not an objective symbol is the same as the registered symbol, comprising:

means for storing an edited result of the objective symbol relating to whether or not the recognition of the objective symbol is successful;

means for classifying the recognized symbol into a symbol successfully recognized, a symbol for which the recognition is failed and a symbol erroneously recognized, in the edited result; and means for updating the feature of the registered symbol based on the edited result by obtaining a new feature which minimizes a distance relative to the symbol successfully recognized, minimizes a distance relative to the symbol for which the recognition is failed, and maximizes a distance relative to the symbol erroneously recognized.

* * * * *